US006574672B1

(12) United States Patent
Mitchell et al.

(10) Patent No.: US 6,574,672 B1
(45) Date of Patent: Jun. 3, 2003

(54) SYSTEM, APPARATUS AND METHOD FOR PROVIDING A PORTABLE CUSTOMIZABLE MAINTENANCE SUPPORT COMPUTER COMMUNICATIONS SYSTEM

(75) Inventors: Dennis B. Mitchell, The Colony, TX (US); Dennis G. Lewis, North Richland Hills, TX (US); James V. W. Head, Hurst, TX (US)

(73) Assignee: Siemens Dematic Postal Automation, L.P., Arlington, TX (US)

( * ) Notice: Subject to any disclaimer, the term of this patent is extended or adjusted under 35 U.S.C. 154(b) by 0 days.

(21) Appl. No.: 09/408,288

(22) Filed: Sep. 29, 1999

Related U.S. Application Data

(60) Provisional application No. 60/126,759, filed on Mar. 29, 1999.

(51) Int. Cl.⁷ .............................................. G06F 15/16
(52) U.S. Cl. ...................... 709/250; 709/200; 709/201; 709/204; 709/217; 709/218
(58) Field of Search ................... 709/250, 200, 709/201, 217, 218, 100, 310, 313; 717/120; 345/700, 751, 764, 810, 839; 361/683

(56) References Cited

U.S. PATENT DOCUMENTS

| | | | |
|---|---|---|---|
| 5,136,528 A | 8/1992 | Fordham et al. ............ 364/578 |
| 5,491,651 A | 2/1996 | Janik ....................... 364/708.1 |
| 5,555,490 A | 9/1996 | Carroll ....................... 361/686 |
| 5,572,401 A | 11/1996 | Carroll ....................... 361/683 |
| 5,581,492 A | * 12/1996 | Janik .......................... 361/683 |
| 5,619,655 A | 4/1997 | Weng et al. ............ 395/200.11 |
| D385,855 S | 11/1997 | Ronzani .................. D14/100 |
| D387,898 S | 12/1997 | Ronzani ...................... D3/215 |
| D390,552 S | 2/1998 | Ronzani ..................... D14/124 |
| 5,719,743 A | 2/1998 | Jenkins et al. ............... 361/683 |
| 5,719,744 A | 2/1998 | Jenkins et al. ............... 361/683 |
| 5,726,660 A | 3/1998 | Purdy et al. ................ 342/357 |
| 5,751,260 A | 5/1998 | Nappi et al. ..................... 345/8 |
| 5,754,451 A | * 5/1998 | Williams ..................... 702/185 |
| 5,757,339 A | 5/1998 | Williams et al. ................ 345/8 |
| 5,781,913 A | 7/1998 | Felsenstein et al. ......... 707/501 |
| 5,798,733 A | 8/1998 | Ethridge ..................... 342/357 |
| 5,805,897 A | * 9/1998 | Glowny ...................... 717/178 |
| 5,832,296 A | * 11/1998 | Wang et al. .................... 710/3 |
| 5,844,656 A | 12/1998 | Ronzani et al. ............. 351/158 |
| 5,844,824 A | * 12/1998 | Newman et al. ............. 345/147 |
| 5,850,388 A | 12/1998 | Anderson et al. ........... 370/252 |
| 5,913,163 A | * 6/1999 | Johansson ................... 455/426 |
| 5,950,167 A | 9/1999 | Yaker ......................... 704/275 |
| 6,138,056 A | * 10/2000 | Hardesty et al. ............ 700/174 |

OTHER PUBLICATIONS

ViA, Inc., "The ViA II PC," brochure, 4 pages.
Labtec, "ClearVoice Headset/Boom Mic," User's Manual, 1998, 5 pages.
Gentex Corporation, "Advanced Electret Microphone Technology," Brochure, 1998, 8 pages.
Lucent Technologies, "Systimax SCS WaveLAN Wireless Solution, Mobility and Flexibility for your Networks," Brochure, 1997, 8 pages.

* cited by examiner

*Primary Examiner*—Frantz B. Jean
(74) *Attorney, Agent, or Firm*—Philip G. Meyers

(57) ABSTRACT

An apparatus and method is disclosed for providing a user with task-specific information that includes a portable instruction system that may be worn by a user, and includes, a computer sufficiently lightweight and designed to be worn by a user to which a memory has been connected. The system includes a display device that can receive display signals from the computer for visual display to the user and an input device by which the user enters commands to the computer. An instructional program is provided that the computer accesses and stores in memory in response to a user command and displays information concerning a task to be performed by the user on the display device in response to commands from the user.

48 Claims, 8 Drawing Sheets ns system

SYSTEM, APPARATUS AND METHOD FOR PROVIDING A PORTABLE CUSTOMIZABLE MAINTENANCE SUPPORT COMPUTER COMMUNICATIONS SYSTEM

This application is a conversion of U.S. Provisional Application Ser. No. 60/126,759, filed Mar. 29, 1999.

TECHNICAL FIELD OF THE INVENTION

The present invention relates in general to the field of real-time instruction and maintenance support, and more particularly, to the use of a portable system, apparatus and method for the remote repair or maintenance of complex mechanical systems that is hands-free and which is customizable on-site for a particular piece of equipment, process, operation or system.

BACKGROUND OF THE INVENTION

Without limiting the scope of the invention, its background is described in connection with a portable computer for use during repair, support and maintenance support operations, as an example.

In order to remain competitive, many industries, such as the aircraft industry, have increasingly automated their assembly processes through the use of computer-controlled equipment. The increase in complexity of the mechanical and computer systems in the airline, automobile, and other industries that rely heavily on automation, have led to the need for an increasingly sophisticated labor force. Unfortunately, the labor markets are failing to meet the demand for highly competent repair and maintenance employees at reduced costs. As equipment becomes more complex, the diagnosis of faults and maintenance of the equipment have, likewise, become more complex.

During the repair and maintenance process, operators are often responsible for diagnosing and resolving problems. Since the processing that occurs with a fully functional piece of equipment is stopped during the repair and maintenance time, it is important that the operator diagnose and resolve the fault expeditiously. The problem is further enhanced by the need for specialized labor that often must be brought from a remote site or another city to perform the repair procedure.

In the case of preventative maintenance, a similar problem to that of repair work is the need to file reports detailing the procedures and repairs accomplished. Part of the task of reporting repair and maintenance work is the need to specify the parts replaced, as well as, reordering of new parts to maintain in inventory. Typically, preventative maintenance is scheduled based upon manufacturer estimates for the lifetime of various components. In order to accurately and completely follow and maintain these schedules, the operator must not only be well-versed in both equipment part location and maintenance procedures, but in correctly filing-out and filing the reports in a timely manner.

Furthermore, the reporting process must allow the user and others to retrieve, view, enhance, and interpret the information. One such procedure is to dictate or "annotate" the diagnosis to produce a final report that may be accessed by other maintenance personnel. More modern systems, such as those in medical record keeping, involve the use of multiple media data with static graphic drawings on the report. These prior art techniques, however, use visual annotations to annotate process and procedures along with the annotator's voice, and to playback the recorded result. Then, the annotations must be transcribed manually in order to produce a complete report.

A system for repair is disclosed in U.S. Pat. No. 5,754,451, issued to Williams entitled, "Preventative Maintenance and Diagnostic System". Williams discloses a maintenance system for a machine controlled by a programmable logic controller having a memory that stores input data received from the machine and output data communicated to the machine. The maintenance system includes a computer interfaced to the memory to be non-intrusive with respect to the programmable logic controller; the computer being operative to monitor a state of the machine over a plurality of manufacturing cycles, including input and output data. The computer is able to detect a fault condition for a component of the machine based upon a state of a current manufacturing cycle and a state of a previous manufacturing cycle. A display device is in communication with the computer to alert an operator of the fault condition and to graphically display a location of the component within the machine to facilitate a corrective measure by the operator. One problem with the prior art, however, is that the operator is always tethered to the computer and must provide commands through a keyboard or like device. Furthermore, the maintenance instructions are native to the machine that is in need of repair or maintenance, requiring that it be in the "on" position during maintenance. Yet another problem with the invention as described is that the machine in need of repair must have been pre-programmed to respond to the maintenance requirements of the hard wire tether and be able to communicate with the computer to which the machine is tethered.

For existing systems in the repair and maintenance industry, or within industries in need of highly specialized on-site repair and maintenance personnel, there is presently no system, apparatus or method of providing multimedia data acquisition, interpretation, instruction and reporting.

SUMMARY OF THE INVENTION

The present invention provides a light, portable hands-off or hands-free maintenance and repair system, using a task-specific hypertexted, animated, voice-synthesized, and/or voice-activated communications and search engine that is able to access a task-specific database. The instructional program or engine is made task-specific by accessing a database of machine, process or operational specific data, which may be computer data, audio and even video clips that provide the user with real-time instructional information about the task or tasks that the user is to perform at a remote location.

The computer device is sufficiently lightweight to use at the remote location and provides hands-free command of the engine and access to the task-specific database so that the user may perform maintenance and repair on the machine, process or operation with the use of both hands. The task-specific information may include technical views and design diagrams of the machine, process flow or operation. The task-specific data will also provide instruction for accessing the machine, process or operation and be displayed to the viewer through a display device that may be, e.g., a head set with partial view of the operation and of the computer display or may even be a hand-held display that the user positions within the user's view.

The present invention includes an information retrieval and input system for displaying task-specific data, with a computer having an input/output device, access to a large capacity information storage and a retrieval device interfaced with the input/output device adapted to receive a memory medium containing the predetermined digitized data. The storage and retrieval device is adapted to access the task-specific data on the memory medium and to provide the data to the input/output device, the predetermined digitized data may be organized in, e.g., a hypertext format.

Hypertext may be accessed directly through a hypertext engine or via software written to access hypertext-based data, as well as data in other formats, e.g., in Microsoft Access or D-Base format. Audio and video input and output devices may be included in a headset adapted to be worn by the user. The head mounted image display is supported by the headset having a virtual image display having one or more eye-pieces adapted to be positioned within the view of the user while performing a specific task thereby providing video display information from the computer to the user in a hands-free, lightweight manner.

The task-specific storage and retrieval instructional program of the present invention provides read/write capability for task-specific data, as well as, hands-free voice recognition for providing access to data that is task-specific on a storage medium or via download. The system provided herein may be part of a network. One such system for use with the portable computer of the present invention is a network card, which provides a wireless computer interface with other users or even a customer support center (CSC) connected through a wireless antenna, through a hard-wired computer network, or a combination thereof.

In operation, the user looks through an eyepiece (or at another type of display) to view a virtual image that appears in front of the eyepiece, creating the illusion of a high-resolution computer screen for view by the user. The user sees an image that a number of menus and buttons that the user accesses by voice-command without the need for a movement controlled device such as a mouse or keyboard, but such a device may be used if voice activation is not necessary or desired.

The display and input devices are connected to a very lightweight computer that accesses data from a large capacity storage device, such as internal hard drive and/or a CD-ROM or DVD-ROM drive and stores user responses on, for example, a "journal" file on the hard drive. These devices may hold the task-specific database(s) that allow the user to make the instructional program task-specific simply by exchanging disks at the remote location. The CD-ROM or DVD may be left at the remote site, thereby allowing any SIMON user to reach the remote location and access the storage medium to access task-specific maintenance and repair information. The data may be transmitted to the user at the remote location via a hard-wire or by wireless transmission. Other mechanisms for downloading information are also within the scope of the invention, including network access, remote access (via telephone lines or otherwise) or satellite-based communication systems.

More particularly, the present invention is directed to a portable instructional system that includes a computer sufficiently lightweight and designed so that it may be worn by a user to which a memory has been connected. The memory is connected to and under the control of the computer together with a data storage device such as a hard drive. The system also includes a display device that can receive display signals from the computer for visual display to the user and an input device by which the user enters commands to the computer. An instructional program is provided that the computer accesses and stores in memory in response to a user command and displays information concerning a task to be performed by the user on the display device in response to commands from the user.

In one embodiment of the present invention, the portable instructional system that may be worn by a user may also be described as having a computer of a size sufficiently small to be carried by a user to which a memory is connected to and under control of the computer. A display device that can receive display signals from the computer for visual display to the user and an input device by which the user enters commands to the computer is also provided. The instructional program that the computer accesses and stores in memory contains instructional information concerning a task to be performed by the user. The system may also include a video camera of a size sufficiently small to be worn or hand-held by a user connected to the system that transmits images from the camera to a remote site and that is accessed by a communications system, whereby the user can communicate with an assistant viewing the images at the remote site concerning the task being performed.

The instruction system may include a first computer of a size sufficiently small to be worn by a user which is connected to a memory connected to and under control of the first computer. A display device is provided that can receive display signals from the first computer for visual display to the user as is an input device by which the user enters commands to the first computer. The instructional program is accessed by the first computer, which the computer stores in memory. The program contains instructional information concerning a task to be performed by the user at a location. The system also may include a second computer at a remote site from the user's location for use by an assistant or supervisor working with the user, which is connected to a communications program by which the second computer receives and displays data from the first computer, which data is of a type that aids in the performance of the task. The first and second computers communicate through a wireless data transmitting and receiving device connected to the first computer, which device can transmit data to the station and receive data from the station. A wireless data transmitting and receiving station having a range, which station can transmit data to and receive data from the first computer anywhere with the range is also provided. Finally, a communications link is provided by which the second computer can send data to and receive data from the wireless station while the user is working on the task within range of the wireless station, permitting audio and/or video teleconferencing between the user and the assistant or supervisor.

A computer communication system for use with the present invention includes a computer of a size sufficiently small to be worn or hand-held by a user. A display device that can receive display signals from the computer for visual display to the user is connected to the computer as is an input device by which the user enters commands to the first computer. Wireless data is transmitted and received through a device connected to the computer, which device can transmit data to the station and receive data from the station. The wireless data transmitting and receiving station has a range, which station can transmit data to and receive data from the first computer anywhere within the range. Also, a computer network that can send data to and receive data from the wireless station while the user is working on the task within range of the wireless station is provided.

Yet another embodiment of the present invention is an instruction system includes an instructional program that controls a computer and is stored in memory, which program contains instructional information concerning a task to be performed by a user at a location. An input/output program is also provided that controls the interaction between the computer and a display device and at least one audio input and output device. A report generating program under the control of the instructional program aids the user in generating and transmitting an electronic report relating to the task performed by the user at a location. Finally, an instructional database under the control of the instructional program, which database comprises information specific to the task to be performed by a user at a location is provided along with a communications program by which the computer communicates data from the computer to a computer network that can receive and transmit data, which data is of a type that aids in reporting performance of the task.

Another embodiment of the present invention is a a computer communication system that includes a first computer of a size sufficiently small to be worn by a user that is connected to and control a memory and a display and audio device that can receive display signals from the first computer for visual display to the user and through which the user may enters commands to the first computer. The first computer is connected to a wireless data transmitting and receiving device, which device can transmit digital data to a wireless data receiving and transmitting station, which station is capable of and receiving and transmitting data from the station. A second computer of a size sufficiently small to be worn by a user is also able to transmit and receive wireless data and allows the users of the first and second computers to communicate in real-time. The second computer is also connected to and controls a memory, and a input and display device.

The present invention also includes a method of providing a user with an instruction system including the steps of providing a user a computer sufficiently lightweight and designed to be worn by the user, connecting a memory to, and under the control of, the computer, displaying on a display device display signals from the computer within the visual range of the user, providing an input device by which the user enters commands into the computer and accessing an instructional program that the computer stores in memory in response to a user command and displays information concerning a task to be performed by the user on the display device in response to commands from the user.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

Figure 1:
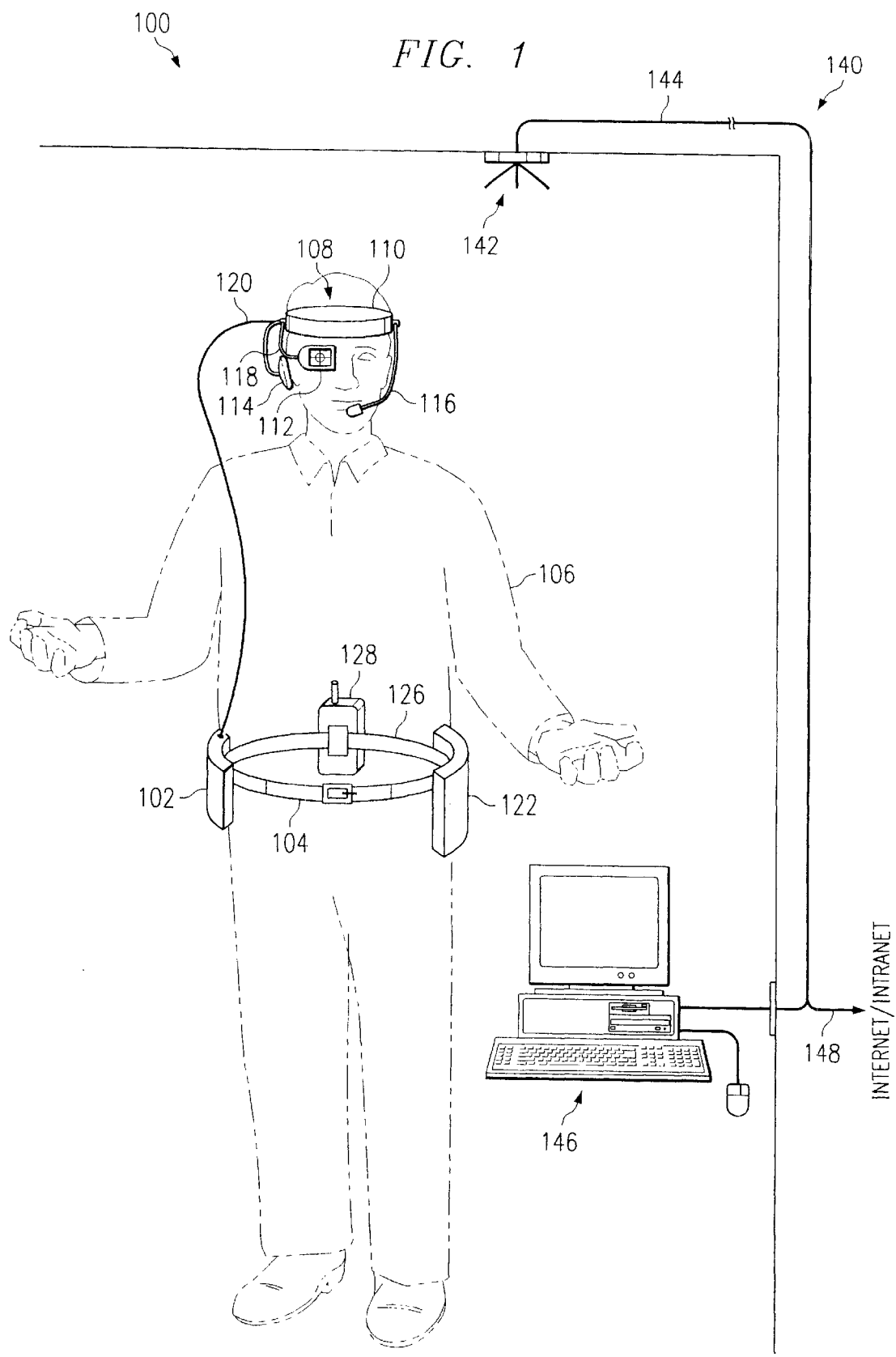
FIG. 1 is a diagram of the basic components of the system disclosed herein.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

The present invention is directed to a system, apparatus and method of providing real-time, on-line help to users that may need assistance in operating, repairing or maintaining a complex system. The present invention is not only a complete, interactive, learning repair and maintenance system, it is customizable for the individual machine that is in need of operator intervention.

Known as SIMON, for System Integrated Maintenance Online, the present invention provides the customer or user with a complete online maintenance package for their specific system. SIMON enables the user to view pages written in, e.g., HyperText Markup Language (HTML). Maintenance procedures are written in HTML. Context sensitive help is available to the user regarding the operations of the SIMON engine. A parts search for the customer's parts database is also available to the user regarding the operations of the SIMON engine. A parts locator, which enables a user to locate a specific part, is also available. SIMON also provide reports, security, communications and learning modules.

Each customer that uses the SIMON engine for a particular machine, operation or process determines which modules they will need, and only need to purchase or use the modules that they need. The content of the SIMON system is specific to the customer's specification equipment, version, machine process or operation. SIMON recognizes voice, mouse, keyboard and touch screen input, and may also use the default windows screen data.

One type of computer system that may be used with the SIMON system is described in U.S. Pat. No. 5,844,824, issued to Newman, et al., the relevant portions of which are incorporated herein by reference. Newman discloses a portion of a hands-free, portable computer and system that may be used with the present invention. The body-worn or portable system includes a hands-free computer system. The system does not rely upon a keyboard input or activation apparatus but rather has various activation means, which are generally hands-free.

The system of the present invention may be used with other systems, other system components and communication apparatus as described herein. Also, various components of the present system may be body worn or placed in a disconnected location if desired.

Another such computer system is disclosed in U.S. Pat. No. 5,581,492, entitled "Flexible Wearable Computer", issued to Janik. The relevant portions of the Janik patent are incorporated herein by reference. Janik discloses a flexible wearable computer in the form of a belt that combines a computer that includes a microprocessor module, a RAM-I/O module, memory modules, a power supply module, and bus termination modules that are connected with flexible signal wires. The computing elements are physically attached to a flexible non-stretchable belt or harness, and may also include a protective cover. For example, the computer may be powered by an 8 hour six volt power supply. The power supply may be a modular battery that is worn as part of a harness or on a belt. The flexible non-stretchable wearable belt or harness may be secured around various parts of the body. The input and output device or devices are connected to the flexible wearable computer by the I/O bus attached to the output and input ports.

The portable computer hardware for use with the present invention may be implemented in many different ways. For example, each module may form part of a solid thermoset plastic casing. Alternatively, a two-part hard plastic shell may be used to encase a mother or one or more sister-boards having thereon the computer components, input/output devices, control devices and the like.

The components and support circuitry needed will generally be surface mounted based on size and soldered to a mother or sister-board. The components may, alternatively, be affixed to the circuit board with a conductive epoxy or other conductive plastic. The computer may be made even thinner and more flexible using chip-on-board and or chip-on-chip manufacturing technology. Each integrated circuit may be bonded directly to a small printed circuit board and the terminals may be electrically connected to the board. Each integrated circuit may also be covered with a heat radiating element to reduce heating of the integrated circuit and increase heat dissipation.

The computer may be implemented as one long multilayer polyamide flexible, or rigid-flex, printed circuit board. As an entirely flexible printed circuit board, the modules that form part of the computer system increase the rigidity and durability of the portions of the computer with electronic components.

To interconnect within a computer component or among the different integrated circuit components or even from one components (See FIG. 1, e.g., the computer 102) to a separate component of the flexible portable computer (See FIG. 1, e.g., storage medium 122) flexible metallic wires or even non-metallic electrically conductive filaments or wires may be used. The same holds true for the connections between the computer hardware and the communications devices and/or the head gear and communications devices thereon. The computer may even be implemented using fiber optic device connections. For such a connection, optical fiber filaments instead of metallic or non-metallic conductors are used with photosensitive detectors at each end of the filament that communicate the optical signal. One advantage or flexible wires or optical connections is that they are easily replaced when worn or may even be disconnected and connected to another device, such as another head gear or even a stand-alone computer.

Furthermore, the configuration of the flexible portable computer need not be in a belt but may be part of a harness, thereby causing a better distribution of the weight of the components during use. The module and bus assembly may be fashioned in a variety of ways such as a vest. When worn as a vest, the harness that contains or holds the flexible computer may even be adapted to look like normal uniforms or clothing, thereby increasing comfort.

Input and output devices for use with the flexible computer may include, for example, a touch sensitive flexible liquid crystal display (LCD) hanging from a belt or even worn on a forearm or thigh. The wearer controls the computer by touching virtual graphical elements on an LCD with either the right or left hand. An added advantage of this design is that individuals that are, for one reason or another, physically challenged may benefit from the availability of a fully integrated hands-off or even hands-on flexible portable computer. A pen-based input and output device may also be used, in combination with, e.g., a Palm Pilot or other hand-held device that may interface with the portable computer and the SIMON engine. For example, the pen location data is sent to the computer via an infra-red link or hard connection and the computer sends corresponding graphical information to the pen-based input and output device.

Another possible configuration for the portable computer for use with the invention is using a free-space pointer input device and a private eye heads-up display as the output device. A free-space pointer, such as a GyroPoint, translates relative three-dimensional motion of the hand into digital pulses that are monitored by the computer. Software drivers translate the digital pulses into corresponding movements of the cursor in the virtual screen generated by the heads-up display. Both the free-space pointer and the heads-up display may be connected to the computer via tethers, thin wires or optically.

The present invention also includes connections via wireless transmission to a Local Area Network (LAN) or a Wide Area Network (WAN). A wireless transceiver, e.g., a Wave-Lan® wireless network IEEE 802.11 card (Lucent Technologies), may be functionally connected to the computer to provide for digital communications to a wireless network backbone. The transceiver communicates via radio-frequency pulses, which may also incorporate echo handling capabilities for delay spread. One or more wireless repeaters and or transceivers may be mounted over the work environment in which the portable computer is worn and used. Security features may also be included in the wireless communication such as data encryption.

Wireless communication may also be via infra-red signals, however, this method generally requires line-of-sight contact between the receiver/transceiver and the antenna or detector on the floor, wall or ceiling. Existing LANs or WANs may be easily retrofitted to add wireless communication capabilities without the need for rewiring.

Also, the wireless communication may allow SIMON users to communicate peer to peer during repair and maintenance operations directly or through a network. With the addition of a LAN/WAN based outdoor antenna, the present system may even be used to communicate SIMON users in two separate buildings or even in remote locations. The LAN/WAN communications network connection may also be used to connect to an intranet or the internet to communicate with remote sites within a same group or corporation to communicate to a centralized consumer support center (CSC).

An audio output device may include one or more earphones, such as a headset. An audio input device such as a microphone is provided for receiving voice commands. Real-time text to speech conversion may be provided using commercially available voice-recognition software, e.g., Dragon Naturally Speaking. The microphone is adapted to receive speech data from the computer and to provide audio input to the earphone. The microphone may even be a lapel worn microphone such as an Electret microphone from Gentex. A light weight headset having an earphone, microphone and a video display may be provided in combination and connected to the computer.

FIG. 1 shows the components and features of a portable computer 100 for use with the present invention as it is worn by a user. A computer 102 may include a housing and be secured by a belt, harness or other attachment apparatus, flexible or not (in the embodiment depicted a strap or belt 104 which is worn around the user's 106 waist for securing the system unit or housing 102), to a user 106. The computer 102 further includes a monocular or duo-ocular display unit 108 for receiving information from the computer 102. The display unit 108 displays information received for the computer 102 under the control of user 106 or a remote operator. The display unit 108 may include a headband 110, a display screen 112, a speaker 114, and a microphone 116 connected to the headband 110. The headband 110 is adapted to be worn by the user 106 in any convenient location, but preferably upon the user's 106 forehead, as depicted. The position of the display screen 112 may be adjusted via the adjustable arm 118 so that the operator may view comfortably information displayed on the display screen 112. As depicted, the adjustable arm 118, is in fact, not only an adjustable arm but a camera that displays to the user 106 through display screen 112 or to an operator at a remote location the image before the user 106. The display screen 112 is electrically connected to the computer 102,. in the present embodiment, via a cable 120, although other ways of connecting the two components may alternatively be employed.

The computer 102 may further include transducers and converters to provide communications with display unit 108 for receiving activating (from audio, eye-tracking or EEG) commands from the user, for converting the receiver commands into electrical signals, for recognizing the converted electrical signals and for sending the recognized electrical signals to a processor within the computer 102. In the present embodiment, the transducers and converters may includes the microphone 116 through which the user 106 may issue verbal commands to the system, apparatus and method of the present invention. The microphone 116, the speaker 114 and the display 118, in the present embodiment, are electrically-connected to the system unit 106 via a cable 120, although those with ordinary skill. in the art will appreciate that any input or transducer device could be used and that the input or transducer could be supported by the user at some other location.

The computer 102, in the present embodiment, may further include physical or non-physical connections to provide communication between the computer 102 and other peripherals 122 that communicate with the computer 102 and that may provide, for example, read-only or read-write memory or other capability (such hard disk, CD-ROM, DVD, Magneto-optical, or like storage devices). In the embodiment depicted, the peripheral pack 122 is also attached to the belt 104 and is electrically connectable via cables 126 to the computer 102. While the present invention as illustrated in FIG. 1 is depicted using voice activation, it will be understood by those of skill in the art that other ways of connecting, accessing and controlling the computer 102 may be substituted therefor as described herein.

Also depicted in FIG. 1, is a wireless remote communications node 128 that serves to interconnect the user 106 with a remote wireless network 140. A wireless antenna or receiver 142 may be positioned in the same or an adjacent room, depending on the range of the wireless remote communications node 128 and the reception and signal throughput required for transmission of audio, video, computer data, or any combinations thereof.

The antenna 142 may connect through a local area network (LAN) or a wide area network (WAN) through, e.g., a hard wire connection 144 to a central server 146, which is in turn connected to the CSC by ISDN lines. The central server may be located in the same facility or adjacent facilities that are connected through the LAN or WAN to the remote wireless network. Alternatively, or as part of the same system, a connection 148 to an intranet, the internet, via modem or other such digital or analog communications system may be used to remotely transmit a signal to a remote location.

Figure 2:
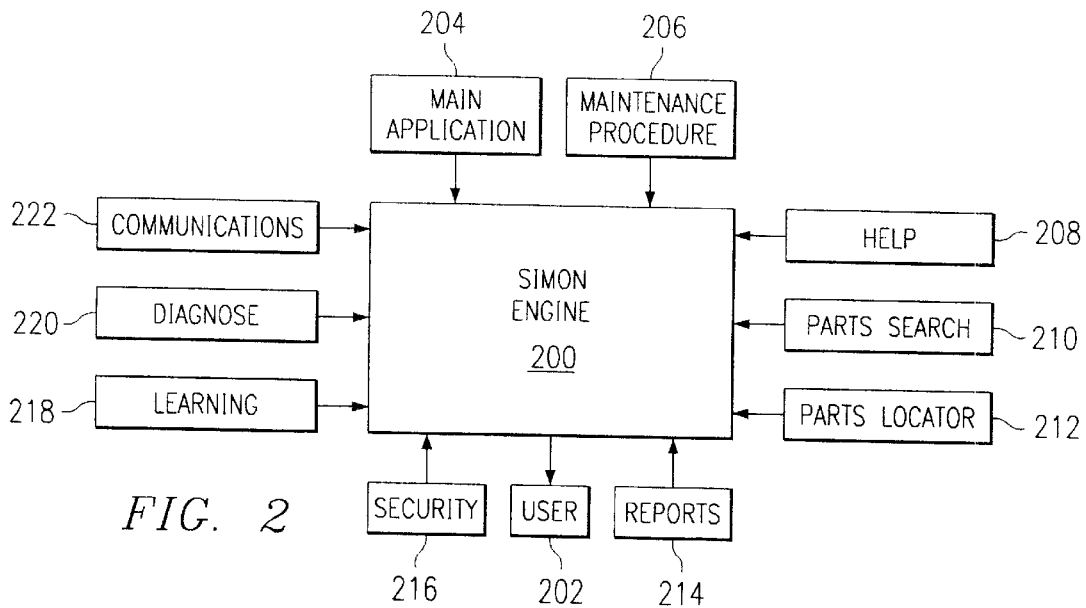
FIG. 2 is flow chart of the interactive components or modules of the SIMON engine and system as they relate to a user performing a task.

FIG. 2 shows a chart with the operational access that SIMON provides to the user of the SIMON portable computer and system. The SIMON engine, designated as 200 provides the user 202 access to a variety of functionalities. The SIMON engine 220 is able to access one or more modules, in real-time, to provide the user 202 with information as to the status of the main application 204 and, e.g., a help menu 208 for running the main program or any of the one or more modules that serve the user 202. For example, the user performing a specific task at a remote location may access the maintenance procedures module 206 to obtain step by step instruction and maintenance procedures for repairing a particular piece of equipment or for the use of certain tools. The SIMON engine 200 also allows a user that is in the maintenance procedures module 206 to access either the parts search module 210 or the parts locator module 212, which permit the user to find out parts numbers and availability in the parts inventory, locally or globally.

The SIMON engine 200 is also able to interface with a reports module 214 that is capable of taking the maintenance procedure information derived from the maintenance procedure module 206 and submit a report, in real-time, on-line or in a subsequent data dump. The report may be used not only to report that the repair has been completed, but may also be capable of providing full parts listings for any new parts used or needed. By tying the reports module 214 into a LAN or WAN, the report may be used to standardize reporting and maintenance procedures without the vagaries and informality often found with hand-written maintenance records. The reports module 212 itself, or a compatible application, may also provide a docket of maintenance to be conducted or that has been missed to update maintenance records.

The SIMON engine 200 is also capable of accessing security protocols that permit or limit the user's 202 access to the SIMON engine 200 itself, for communications outside of the SIMON engine 200, for access to information from the other modules, or any other security protocols that may be necessary. The SIMON engine 200 is also capable of improving its help to the user 202 through the learning module 218. The learning module 218 permits the SIMON engine 200 to increase user 202 performance by, e.g., noticing patterns in the user's 202 method of accessing the SIMON engine 200 and its modules to anticipate the user's 202 needs. The diagnose module 220 allows the SIMON engine 200 to-provide troubleshooting information to the user 202 with real-time or on-line access to diagnostic protocols, equipment or remote diagnosis capabilities.

The communications module 222 allows the SIMON engine 200 to interface with a variety of sources of information, communications, data, and the like. For example, the communications module provides not only the voice-recognition capabilities to the SIMON engine 200, but also allows communications within the equipment that serves, and is in contact with the SIMON engine 200 and the user 202. The communications module 222 is capable of accessing audio and video captured on any storage medium associated, or in communications with, the SIMON engine 200. The communications module 222 also permits the SIMON engine 200 to communicate by hard wire or wireless with a LAN, WAN, intranet, internet or other network with which the SIMON engine 200 may need communication. Data transfer through these local or remote networks may include, e.g., data, sound, voice, images, video or other analog or digital information that the user 202 may be able to access through the SIMON engine 200.

More importantly, the SIMON engine 200 provides a "shell" program that is used to access machine, process or operation specific instructional programming, databases, troubleshooting, reporting and other information to a user performing a task at a remote location. The instructional task specific information may be stored at the remote location in the form of, e.g., CD-ROM or hard drive files that contain data, audio, image and video information that is specific to the task before the user.

If a user must repair or maintain several different pieces of equipment in a given day, e.g., a single SIMON engine loaded on a portable computer is able to provide the user with task-specific information by loading the task-specific data. Once the task has been conducted, the task-specific data is removed or erased and new task-specific instructional data is accessed through the SIMON engine at a new location or for a different machine, process or operation. The SIMON engine may be implemented in software, in hardware as a ROM or a combination of hardware and software.

Main Application

The main application module 204 of the SIMON engine may have, itself, a modular design and may be developed using Microsoft Visual Basic 6.0 or Microsoft Visual C++ 6.0. The main application module 204 interfaces with a browser engine developed with, e.g., Microsoft Visual C++ 6.0. The main application module 204 enables the user to view pages written in, e.g., HyperText Markup Language (HTML) and interface with a machine's diagnostics file. Support for JavaScript and standard web related plug-ins (such as audio, video), may also be included as part of the browser interface.

Additional features may include voice activation using AT&T Watson Voice Control, or other voice control software and a Computer Aided Design (CAD) drawing viewer supported by the Autodesk Whip plug-in or other application. The application may be designed to run under Windows 95/98, Macintosh or Windows NT operating system (OS).

Voice activation allows the user hands-free operation. All functions achieved via buttons or mouse events are capable of being achieved through voice commands. The Whip plug-in allows the user to view, e.g., CAD drawings in Drawing Web Format (DWF). The functions of zoom, pan, and scroll are controlled by Whip plug-in or other application, and may be voice-activated through voice control software.

The main application module 204 may have text-defined buttons across the top part of the screen that provides access to the other modules. Main buttons display a sub-button menu for additional options. A second set of buttons is displayed along the bottom of the screen that will show the general controls most needed for a specific function. Other buttons are displayed as necessary along the left side or bottom of the screen as required for each function. The main application module 204 may be designed to be the same for each customer or for each user. Some features and properties of the main application module 204, however, may be deactivated at the customer's request prior to installation, and the customer may even control some features. Commands for voice activation may also be standardized, with additional commands customized to meet customer needs. The standard commands are single or two word "keywords" to insure consistency and connection accuracy.

The response time using a keyboard, mouse, or voice activation to access the main application module 204 and the other modules will generally be less than 2 seconds. Requests for customized commands may be analyzed for complexity and structured to meet the response time criteria or an individual system or user.

The main application module 204 of the SIMON engine functions as the main Graphical User Interface (GUI) from which all other modules are called. Since SIMON is primarily an HTML page viewer, it is visible at all times and will have a window area large enough to accommodate the HTML contents, but may be written in other like codes having like functionality. Each function of the main application module 204 is capable of user activation by means of a keyboard, mouse, or voice activation. Voice commands may match the button command or common commands identified in the command dictionary. Voice commanded words that are active within a specific HTML page are made known to the user through text variation of the voice active word.

Figure 3:
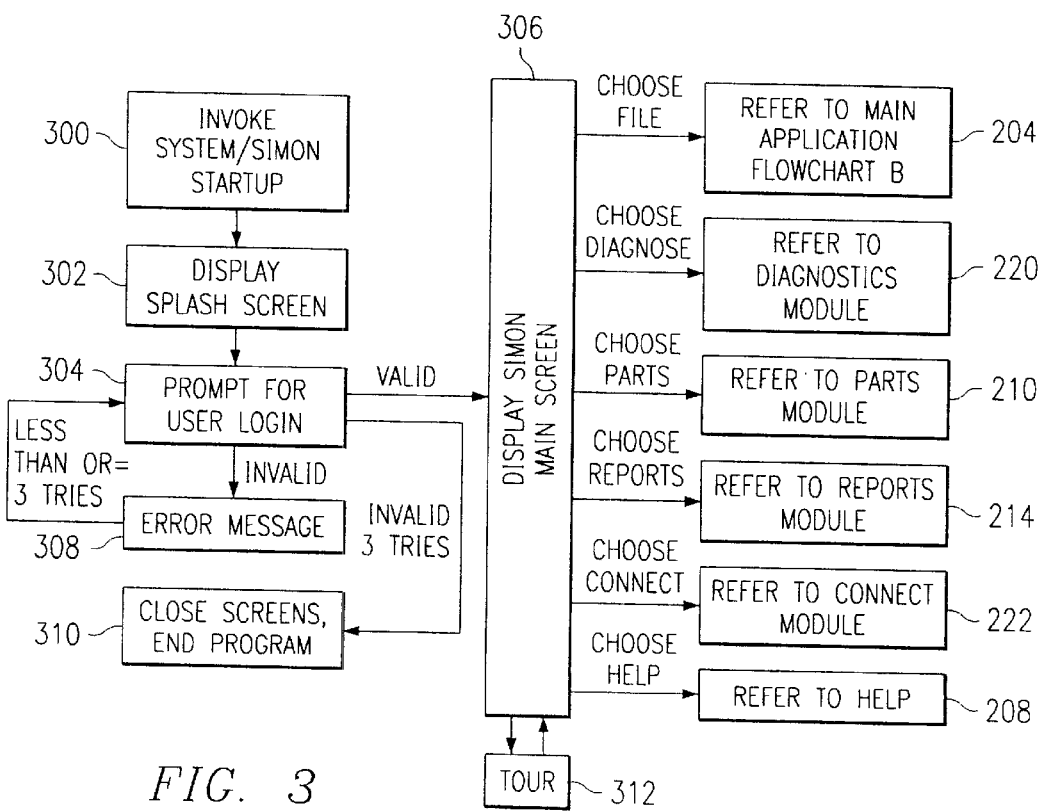
FIG. 3 is a first flow chart of a basic operating system and main application of the present invention.

Turning now to FIG. 3, the SIMON engine may automatically open when the user powers on the computer loaded with SIMON. If the SIMON engine is not part of the start-up of the computer when the computer was last shutdown, an icon is made available on the desktop that will allow the user to use voice, mouse or keyboard to activate SIMON. SIMON opens with a login prompt 300 requesting the user to input their assigned ID and password. Such a login screen may or may not be required depending on system's security requirements as well as the presence or absence of the reports module. The user inputs their login information via a keyboard, voice activated or other input and SIMON determines is the user login is valid at 302. On confirmation, the user is directed to, e.g., a splash screen 304 followed by a display start up screen 306. The option to tour the functions of SIMON are selected at decision box 308, which permits the user to start SIMON 310 or enter a SIMON tour 312.

If the login is invalid, an error message 314 is presented to the user and the user is allowed to try to re-enter the login name and password at decision box 316. If three failed attempts are made, then the user is forced to exit the application at 318. Additional security may be added that requires administrator intervention to allow renewed access to the login prompt 300, if necessary.

After confirmation and log-in, and following a brief change in screen appearance or splash screen 304, the user is given the option to tour 312 the functions of SIMON at the main screen display 320. If tour is chosen at 312, the user is presented with a training presentation on the basic operation of SIMON. The presentation will show the user the basic voice commands and how the various functions work. Upon completion, the user should have a good general understanding of how SIMON works and how to access its modules. The user is returned to the select option decision box 308, which permits the user to start SIMON 310 or exit the SIMON application 318. The decision for which module of SIMON the user selects is made at decision box 322, which permits the user to enter a number of SIMON functions, including, for example, the SIMON program setup 324, a maintenance procedure module 326, a diagnosis module 328, a parts module 330, a reports module 332, a communications or connection module 334 or a help module 336. Similar modules are depicted in FIG. 2.

Figure 4:
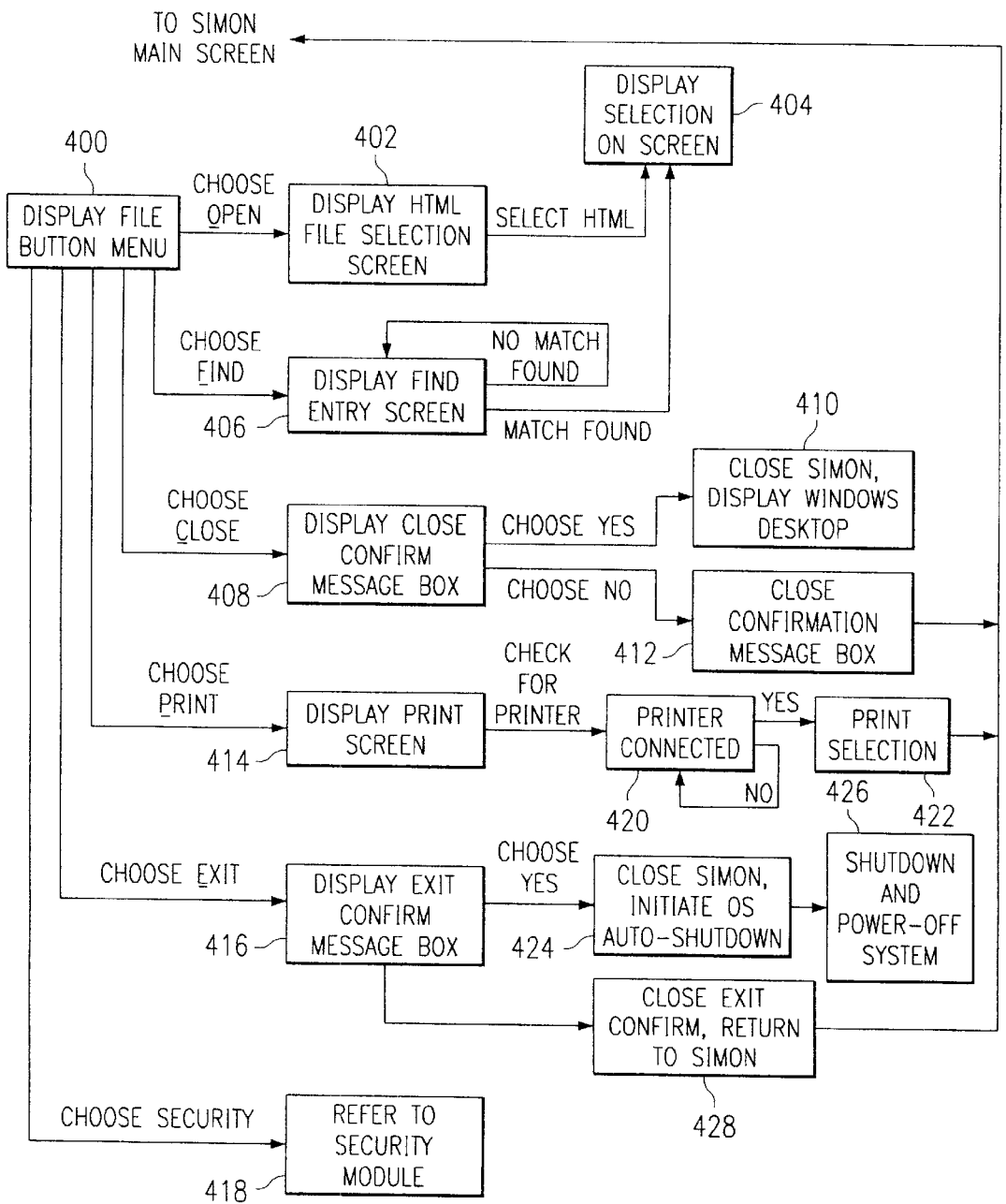
FIG. 4 is a second flow chart of the main application and its relation to various modules.

Turning now to FIG. 4, in conjunction with FIG. 3, if the set-up option is selected 324, the user is allowed to choose from a number of options at 400. One option for the SIMON engine is to permit the user to select from a number of systems in need of maintenance to choose from. At system select 402, the user is prompted to select from a list of available systems by displaying a list of machine types and machine model numbers that are available to the SIMON engine. The user then selects from the list of machines displayed 404. Alternatively, the user may be allowed to search by entering a machine to machine model from which to choose or that may be downloaded from a local or remote site. Alternatively, the administrator may deactivate this feature if the SIMON engine is already machine, process or operation specific. Once the user selects from the list, SIMON will open the SIMON introductory page and load the appropriate HTML page for that machine and model. The user may then choose to start the maintenance operation by indicating that they are familiar with SIMON and have knowledge of how to work on that particular system in need of maintenance.

Alternatively, the user may access, through SIMON, local or online reference material and are immediately prompted with a selection criteria for use and operation. Navigation may be through a keyboard, mouse or preferably through voice or visual recognition commands.

The set-up option menu 324 in addition to allowing access to preselected options at 402, also permits the user to access specific files by accessing a drive and directory where SIMON data files, such as HTML and database files are located 408. The particular type of machine(s) or the operation(s) that will be accessed through the SIMON engine may be selected from the menu or directory and access to the same may be restricted by the administrator depending on the user. The user may either select from a list of file types or may search via name, number or other identifier until a match is found.

The set-up display menu 324 also permits the user to access a customer support center (CSC) link 410, through which the user may have direct access to one or more CSC's. A preselected list may be made available to the user depending on the machine and model selected at 402. The configuration options for the CSC may also be selected at 412, which will conform to the CSC that is being accessed and the various options available to the user in terms of data, audio and video access. The user may also select set-up options local to the portable system that the user is using. One such option is the speech set-up 414, in which the user is permitted to change the user speech profile. This option is particularly useful when more that one user, or even a new user, may be using a portable SIMON system and the computer needs to be instructed on the particular speech pattern of the user.

Likewise, the set-up display menu 324 may be used to access the security set-up 418, which permits the user, depending on their level of user, to modify, e.g., user accounts and privileges 420. The user is also allowed to close 422, exit 426 or shut down 430 the system. The close option 422 closes the main set-up window 424 and returns the user to the start-up display screen 306 (see FIG. 3). The exit option 426, exits the SIMON application all together and returns the user to the desktop of the system. The shutdown option 430, on the other hand, exits both the SIMON engine or application and initiates or prompts for the operating system of the computer on which SIMON is operating to shut-down.

All user inputs may be activated by, e.g., voice, keyboard, or mouse. Input choice may be activated from a button menu. When a specific button from the button menu is chosen, the button sub-buttons are displayed on the screen. The following is a brief list of commands that may be automatically accessed by the SIMON engine by pressing a button on the screen or via single keyword, sound or visual cue from the SIMON engine by the user:

File—File button, when activated displays "File" sub-buttons on screen with the following options:

Open—If "Open" is chosen, the user is given a choice of which HTML file to open. If only one HTML file is available, that file is the default HTML file to open.

Find—"Find" will activate a pop up window allowing the user to speak or type the word they wish to find. "Find" will search the active HTML page for the requested word and if found will highlight the word. The user is able to close "Find" and continue in the active HTML page or elect to find the next instance of the word by using the "Find Next" button. If no match of the word is found, the user will receive a message box indicating "No match found".

Exit—If "Exit" is chosen, the user is prompted to confirm close with a Confirm Exit box. If the user chooses No, the Confirm Exit box will close and the user remains in the active HTML page. If the user chooses Yes, SIMON saves any updates to the appropriate report_log file and then exit the active HTML page. SIMON will then return the user to the Windows/NT OS desktop.

Print—SIMON system may be attached to a printer if the user wishes to produce hard copy reports or even to "print" to a remote location electronically as a fax or data transmission. If the user selects print, a SIMON Print box will appear to identify the default printer and allow the user a print selection of reports or HTML page. The daily report log is highlighted as the default print selection. Date defaults to current system date for daily reports. If the user selects any other item, that item becomes the highlighted selection. The user may select an alternate date to generate a desired report. The HTML page selection refers to the active HTML page. Choosing "Ok" will print the highlighted selection to the designated printer. Cancel will close print and SIMON will return to the active HTML page. Individual report specifications identified under the Report Module, as described in detail hereinbelow.

Security—If "Security" is chosen, a security log-in window is presented. On verification of the users ID and password as administrator, the user is allowed to add users, modify existing users and delete existing users delete the report log-files and deactivate the machine type entry box through the "Administration Edit" screen. The "Machine Type Input Box" default is activated. If deactivate is chosen, the button will change to "Activate Machine Type."

Shutdown—If "Shutdown" is chosen, the user is prompted to confirm shutdown with a "Confirm Shutdown" box. If user chooses No, the "Confirm Shutdown" box will close and the user will remain in the active HTML page. If the user chooses Yes, SIMON will exit the active HTML page then proceed to initiate the complete OS shutdown sequence. "Shutdown" allows the user to turn the power off after shutdown complete, without having to initiate shutdown through the Windows/NT OS.

Diagnose—Diagnose allows the user to connect to the specified machine diagnostics file. Diagnose activates the Diagnostics Module as identified in the Diagnostics Module, as described in detail hereinbelow.

Parts—Parts when activated displays Parts sub-buttons on screen. Parts provides access to the task specific parts database and parts locator through the parts module.

Search—Search activates parts_search. Parts_search allows the user to search a task specific database for a part by using a part number or part description. Parts_search is defined in the Parts Module specifications.

Locator—Locator activates parts_locator. Parts_locator allows the user to display the customer defined, task specific graphical view of the equipment parts. Parts_locator is defined in the Parts Locator Module specifications.

Reports—Reports when activated displays Reports sub-buttons on screen. Reports are defined in the Reports Module and are also task specific and may be customer defined. Reports allow the user to choose the type of report to print. To insure security control of information, only the user with appropriate administrative rights is allowed to delete report_log file information.

Daily—The Daily report is the default report that is generated when the user logs on. This is the default report to print when File_print is activated.

Custom—Custom reports will allow the user to generate a report by specifying the time interval desired. The Custom report also allows the user to create and filter a report by type of maintenance (repair or preventive maintenance).

Connect—Connect when activated displays Connect sub-button on screen. Connect allows the user to establish a connection with a CSC computer. The connection allows full duplex audio and live or still image video transmission, as needed.

CSC—If the user selects CSC, SIMON will deactivate the voice command features of the HTML application and SIMON interface. Once voice commands are deactivated, SIMON will establish an audio/video connection allowing the user to have full duplex net conferencing type communications with the default CSC.

Connection from a SIMON user performing a task to the CSC may be provided by, e.g., connecting the SIMON user having a Wavelan® wireless transceiver to a server having a Wavepoint connection. The Wavepoint hardware and software connect to a VBX telephone box-CODEC hybrid connection. The VBX/CODEC transmits a SIMON inquiry through an ISDN connection to another XBC/CODECLAN connection at the CSC. The CSC can then receive, transmit and display information from the SIMON user, be it data (such as a report or system status), video and audio that allow the personnel at the CSC to view the task that the SIMON user has an inquiry about in real time. Of particular importance is video transmission in color, where the color of wiring may be of critical importance to completing the task, but more importantly, for the safety of the user in particularly dangerous situations.

The audio connection may be active at all times during the CSC connection. The video connection is at the control of the user and activated as needed. If the video connection is activated, a small window will open on the user screen allowing the user to view the video feed to the CSC. When the user has completed the communication with the CSC, a salutation such as "hang-up", "disconnect" or "good-bye" will trigger SIMON to disconnect and close the CSC connection. SIMON will verify that the connection is closed and re-activate the voice command features of the HTML file and SIMON interface.

The customer will define the default CSC. If the customer chooses to have additional CSC listings, each CSC will have its own unique identification name and will follow the same series of commands as if selecting the default CSC.

Help—Help when activated displays Help sub-buttons on screen. The user can select Help Contents or About SIMON.

Help Contents—Help Contents opens a new window and allows the user to choose the type of help wanted. The choices for help under Help Contents are SIMON Commands, Parts Search, Viewing DWF Drawings, About Reports, About Audio/Video and Dictionary. Each of these help topics will offer definitions or instructions depending on the title chosen. Help Contents is defined in Help Module.

About SIMON—About SIMON opens a floating window. About SIMON contains the legal information, customer registration information, license information and plug-in information that are required to use SIMON. About SIMON is defined in the Help Module.

The SIMON engine may also have a failure contingencies an error message is displayed if data is not accessible. The user is able to connect to a CSC. The Main Application program is written in Microsoft Visual Basic 6.0 and/or Microsoft Visual C++ 6.0. Computer Security Requirements may include a security level set up in the security functions. Human performance requirements, and/or reports thereof, may be included for the purpose of monitoring user performance during a particular maintenance operation.

As mentioned hereinabove, individual modules that are part of SIMON are used in conjunction with the HTML content and within its context, that is depending on the machine and model. The machine/model specific modules may contain program default information as well as customized information per customer request. For example, default information are items that are part of the SIMON application such as the command dictionary within the help module 208. If the user requires assistance from a customer service center (CSC), they are able to connect and send both audio and video by means of net conferencing via the communications module 222. Upon speaking the command for A/V connection, SIMON will dial the customer service center and activate the video camera for live feed. Commands (e.g., mute or pause) for the A/V will give the user some control over the functions of both the audio and video feed.

Upon completion of using SIMON, information pertaining to the specific machine/model and repair parameters that are preselected or that are modified in the set-up module may be automatically saved in, e.g., a report_log file for future reference and or report output for use in the reports module 214. Before completion of log-off, the user is prompted to verify the type of maintenance or repair performed, if the repair/maintenance task was completed, and add any additional comments regarding the repair/maintenance the user may wish to add. A standard set of report options as well as a set of customized reports may be provided for the specific task and may be reported as defined in the Report Module 214, described hereinbelow.

The user will have the choice of "Shutdown" or "Exit". Choosing "Shutdown" instructs SIMON to initiate a complete shut down of the system. Complete shutdown from SIMON will activate the Windows/NT OS shutdown sequence and allow the user to turn off the power when prompted to do so. "Exit" closes SIMON and returns the user to the Windows/NT desktop allowing the user to initiate shut down when ready. The user may be required to enter the machine type and machine number of the machine they are working on (this feature can be deactivated by administrator).

If shutdown is chosen then the entire SIMON engine program may be shut down by connecting into the SIMON-operating system automatic shutdown protocol prior to complete program shutdown. The user may also chose to exit the current customized machine or operation module and return to the main SIMON screen. A default set of voice command may also be activated through the use of a keyboard or mouse. Additional commands may be added at customer request. Audio and video net conferencing, auto dial capabilities may be provided when connection to a CSC is requested. A video stream feed allows a CSC the same view as user, while a full duplex audio connection allows the user to speak to the CSC direct.

Maintenance Procedures Module

Specific performance requirements for the maintenance module 206 may be provided using information displayed using HTML (HyperText Markup Language). Button options allow the user to move between procedures. The maintenance procedures will allow the user to view online procedures to repair, maintain, clean, etc. Video (MPEG—Motion Picture Experts Group—files) are viewable from the maintenance procedures. The content is task specific, which may be selected in the set-up menu.

Figure 5:
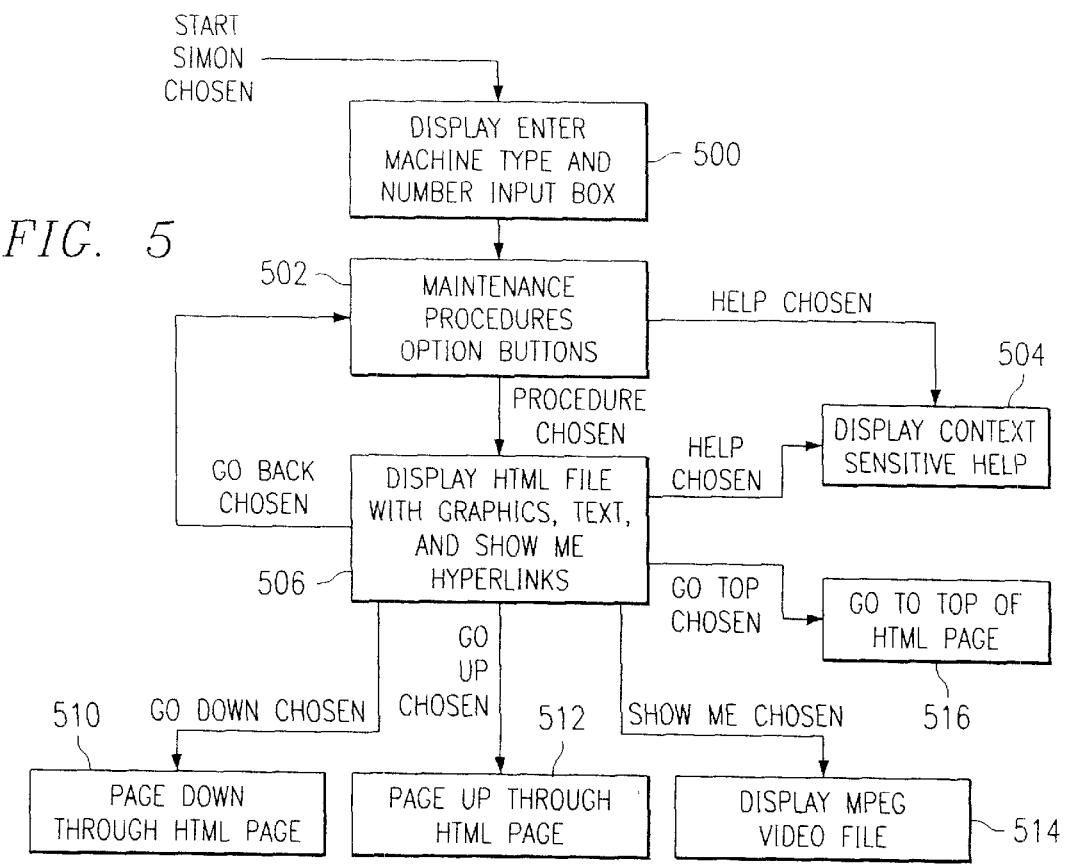
FIG. 5 is a flow chart of the maintenance procedures module.

FIG. 5 provides a flow chart of the maintenance procedure module 326. For the maintenance or repair procedure data and information to be accurate, the user may be prompted to select the required machine, process or operation type and number; if one has not already been selected. Next, the user is prompted to select a maintenance operation option at 500. Two options that may be made available to the user are to instruct SIMON to provide maintenance information related to procedures that are either unscheduled 502 or preventive 504. Depending on the type of maintenance operation that is selected, the SIMON engine will display a browser window that permits for navigation of the appropriate HTML menu page 506. The browser window provides the user with options to select at 508, which permit the user to access, for example, hyperlink controls may also have standard and customized browser controls for further navigation. The user may even be provided with a list and schedule for each of the maintenance operations, whether preventive or scheduled.

If hyperlink 510 is chosen, then a context sensitive display 512 is activated that provides the user with specific information about the maintenance procedures. For example, MPEG video, Autocad drawings, viewer and schematics, etc., are displayed for the user. Alternatively, the user may select to enter a browser control 514 window though which the user select may elect to operate the functions of the browser, such as home, refresh, back, print, find, etc., that are enabled through the HTML menu page 506.

One of the options provided at the maintenance procedure options prompt is the display of the graphics, text and any links that are provided for that particular option. An option display may, for example, include a link to the context sensitive display At the option display the user is allowed to access information that is selected by paging down or up through the HTML page for the maintenance procedure(s). Alternatively, and if available, the user may be prompted to display a sound or video clip, or may simply return to the top of the page. The user may be provided with the source data and/or reference equipment or permitted to input context specific information at the administration level, if appropriate.

HTML files will lead the user through the maintenance procedures, by hyperlinking with point and click or voice activation. The maintenance procedure HTML displays may display the procedure using graphics, text, audio or video. The information contained in the HTML is customer specific data. The user can choose a "Show Me How" option to view video (MPEG files) for tasks requiring supporting motion video. As with the previous module, and in fact all the modules of the SIMON engine, these are voice, visually, keyboard or mouse activated. The user will select button options to view the maintenance procedure data, as follows. The content is specific to the user's task and is displayed as follows. The user is able to view video clips by clicking or speaking the "Show Me How" hyperlink. If multiple MPEG files are used, a different voice command is provided for each MPEG file.

Help Module

The help module shows the user a number of options that permit access to help information from a variety of sources and at a variety of levels. For example, help button options allow the user to select the type of help requested. Two immediate options that may be made available to the user are "Help Contents" and "About SIMON". The help information may also be displayed using HTML. The help module allows the user to view on-line help information for the various functions of SIMON as well as the legal requirements necessary for the ownership and use of SIMON. The HTML help pages will contain text and graphics.

Specific performance requirements for the maintenance module 206 may be provided using information displayed using HTML (HyperText Markup Language). Button options allow the user to move between procedures. The maintenance procedures will allow the user to view online procedures to repair, maintain, clean, etc. Video (MPEG—Motion Picture Experts Group—files) are viewable from the maintenance procedures. The content is task specific, which may be selected in the set-up menu.

Figure 6:
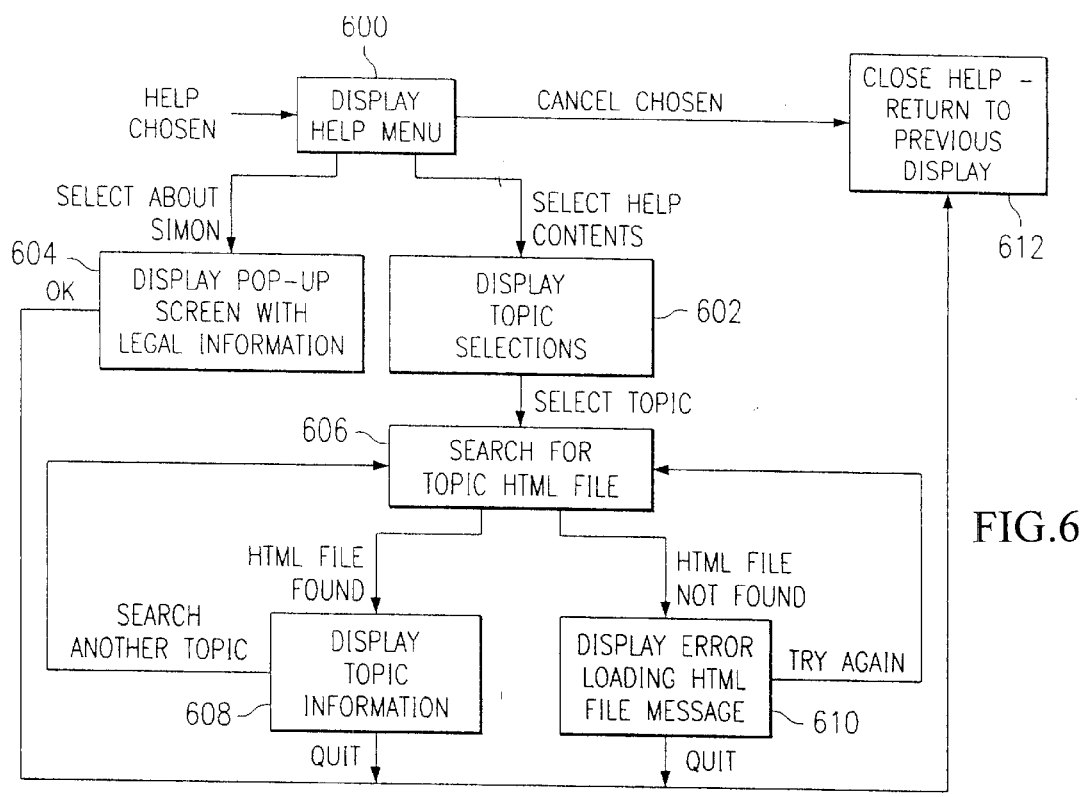
FIG. 6 is a flow chart of the help module.

FIG. 6 provides a flow chart of the help module 600. First, the user is prompted to select a help operation option at 602. Three options are made available to the user in help module 600 to instruct SIMON to provide help information related to the characteristics of the SIMON engine 604, such as the display of copyright and version information 606. Depending on the type of engine and version, the SIMON engine will display a browser window that contains the appropriate information. The user may also select the Tour Simon 608 option, that directs the user into a multimedia presentation 610 that contains information about the SIMON engine, its uses, etc. Alternatively, the user may select the contents 612 menu that directs the user to a browser window that provides the user with options 616 to select at 614, which permit the user to access, for example, hyperlink controls 618 may also have standard and customized browser controls for further navigation 622.

If hyperlink 618 is chosen, then a context sensitive display 620 is activated that provides the user with specific information about the content of help available. For example, MPEG video, Autocad drawings, viewer and schematics, etc. are displayed for the user. Alternatively, the user may select to enter a browser control 622 window though which the user select may elect to operate the functions of the browser, such as home, refresh, back, print, find, etc. that are enabled through the HTML menu page 624.

The help module 600 may have the same help information for all customers for a particular machine, process or operation, however, other more user or task specific options may be made available to specific users whether by limiting access to the information or by not providing information that may be outside the expertise of the specific user.

The help module may be written with Microsoft Visual Basic 6.0. Pages for Help may be written in HTML. "About SIMON" information may be written in a Visual Basic 6.0 window.

The contents of the help function for use with the SIMON engine may include topic selections that provide a list of "Help Contents", which the user may access through a selection of preselected help topics. The "Help Contents" portion of the topic selection index is a list of available help topics from which to choose. Selection of a topic display help information about a specific topic may also be reached by searching using letters, keywords or phrases as part of the search topic profile of the help menu. If the searched for topic is found within the selected help contents menu, then the SIMON engine takes the user to the specific location of the search information sought, or the user may be prompted to another selection after reviewing the material presented. Alternatively, the user may not find a topic and an error message is displayed and the user is prompted to try again. At any point, the user is permitted to chose the close help option that returns the user to the main SIMON engine window.

The default Help HTML page that contains the selected topics and may be created using Microsoft Visual Basic 6.0. Voice, keyboard or mouse activates all user inputs. When user selects the Help button, the Help sub-buttons are displayed. The user will have the choice of selecting "Help Contents" or "About SIMON".

Help Contents—Help Contents displays a list of available help topics. The Help Contents HTML page displays a list of available topics. Topics will include SIMON Commands, Online Reference Parts Information, Viewing DWF Drawings, About Reports, and About Audio/Video. Each topic will link to its specific HTML page and further expand on the help information available to that topic.

About SIMON—About SIMON opens a floating window. About SIMON will contain the legal information, customer registration information, license information and plug-in information that are required to use SIMON. If the Help Content HTML page fails to load, an error message will appear. The user will have the option to try again or leave the Help Content.

An error message is displayed if the HTML page fails to load. The user is given the choice quit or try again. If it fails a second time, the user is instructed on how to check for the HTML help page and how to reload the page if necessary. Content for Help may be written in HTML and the display configuration will depend on the system, operator, machine or operation to be undertaken.

The Help module may or may not include any functions that may be changed by the user. The security may be defined at the programming level or by limiting or not providing the user access to help data beyond the preselected criteria of the SIMON engine that was customized for that particular use. The help module may even provide a dictionary of components and provide the user with alternative references for a like item in a task specific manner or context. Likewise, the help module may provide the user with help as to the use of SIMON, its command structure and capabilities. The help module may even be used to obtain step by step instruction for communication with a CSC.

Parts Search Module

The parts search module provides the user with information that is read from a parts database, whether local to the computer or fixed storage medium or available through the communications module. The parts database can be in Microsoft Access or Oracle. Search request information is input from the user. A database search will occur and records are read and displayed. The matching records are displayed, for example, up to 20 at a time. Error messages are displayed if a database error occurs, the data is not in the expected format, or if no data is entered. If no data is found a message is displayed to that effect.

Figure 7:
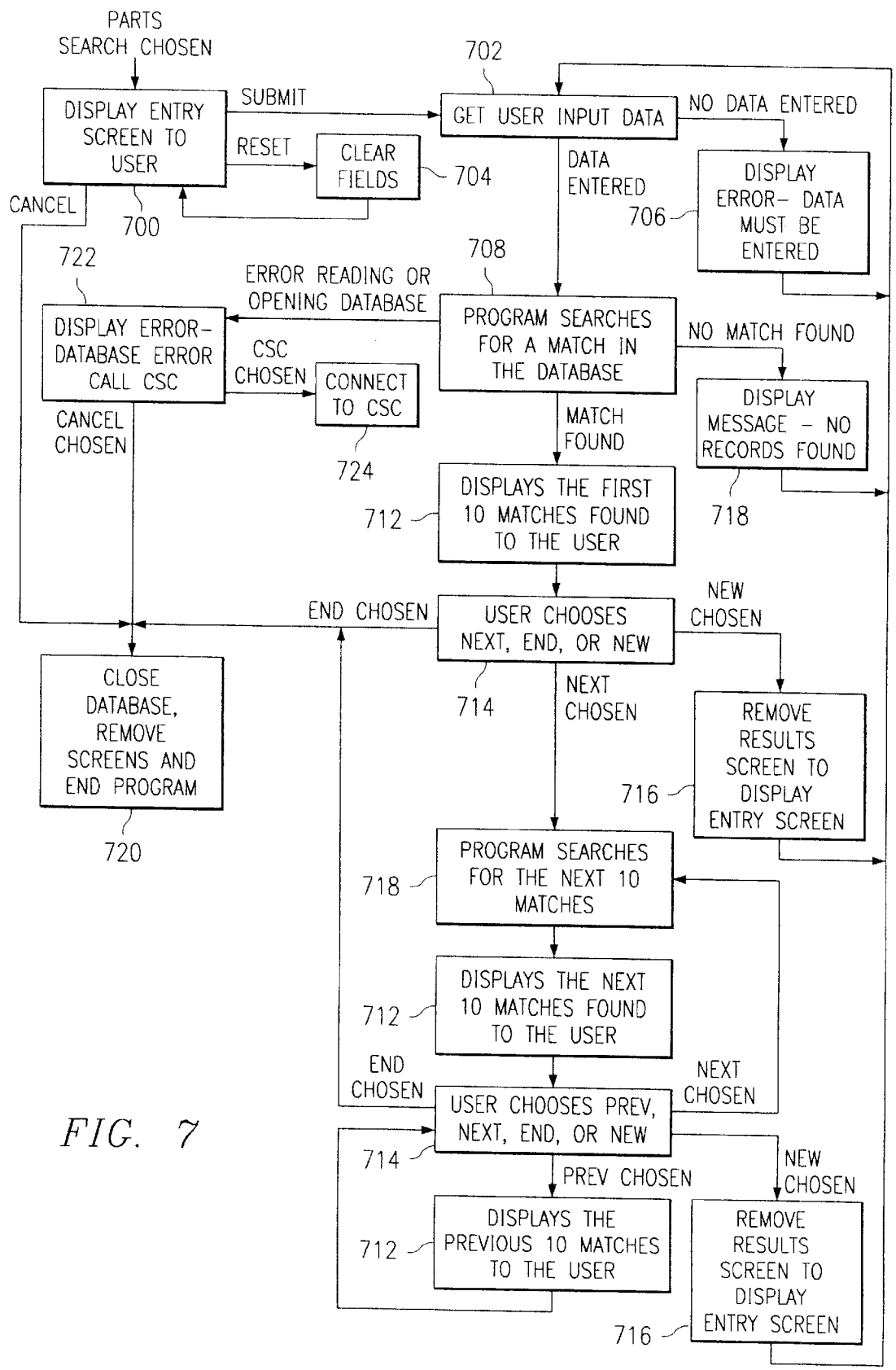
FIG. 7 is a flow chart of the parts search module of the invention.

The parts locator or data module is now described in connection with FIG. 7. The display parts menu 700 may be a custom format for each task that a user needs to perform. The program determines the database format, e.g., Microsoft Access or Oracle. The program will read the header information to determine the fields and field lengths. The search will not be performed if the program cannot open the database, the database is not readable or is not in the correct format.

The parts program may be called display parts 700 and is accessed through a display entry screen 700 in which the user is prompted to selection 702 from a two options: locate parts 704 or search parts 706. If the user selects the locate parts 704 option, then the user may select the contents from a menu in a browser window 708 that provides the user with options 710. The options 710 available to the user may include hyperlink controls 712 or customizable browser controls 716.

If hyperlink 712 is chosen, then a context sensitive display 714 is activated that provides the user with specific information about the parts available. For example, MPEG video, AutoCAD drawings, viewer and schematics, etc., are displayed for the user. Alternatively, the user may select to enter a browser control 716 window though which the user select may elect to operate the functions of the browser, such as home, refresh, back, print, find, etc., that are enabled through the HTML menu page 718

Alternatively, the user is prompted to search the parts database 706 or submits user provided data to be searched at a display entry screen 720. The user may then make a selection from the criteria provided by the user or made available to the user at retrieve search criteria 722. The user may then select from three options at 724. If the user decides to submit the criteria input or selected by the user 726, the criteria is directed to a query database 728 for an exact, partial or related search parameters. If the user makes an error in input the user may cancel the search at 740 which leads the user to the main menu at 742. Alternatively, if the user makes an error the fields may be reset and a set search blank criteria is presented to the user at 746. Reset clears any and all search fields 722 input by the user, thereby resetting the search parameters. If no data is entered an error is displayed, which then prompts the user to once again input user data.

If the user provides input data, such as part name, number, catalog number and the like, the parts program searches the database for the corresponding part. The search results are then displayed 730. If no records match a message is displayed that no records were found using the user input search parameters and the user is provided with an options menu 732, from which the user may select a new search 734, the next 20 search hits 736 or to end the search 738. The next 20 hits are provided at 742; if 20 or a fractions thereof remains. If the user selects to end the search, then the user is returned to the main screen 742, wherein the user is allowed to choose from the main menu options.

The user may input a data request directly or select from a "call-out" number that is linked to an image of the machine, process or operation that a user is performing and that the user accessed through the SIMON engine. The program will get the data entered and send a message that contains the user input to parts_search to start the database search. If the search yields a match or several matches then the program displays a screen to the user with the first 20 data search output matches.

If the user asks for more data a message is sent to parts_search. Parts_search will send more data and it is displayed. If the user is finished, a message is sent to parts_search and the program ends. This option allows the user to look at however many screens are part of the parts search information for that particular part.

A number of functions may be provided that form part of the parts search module.

begin_search—opens the database, call search_records. When finished is received from display_parts, the database is closed. If the open is not successful, an error message is sent to display_parts.

search_records—finds the first 20 records that match the data received and send them to display_parts. If no records are found a message is sent to display_parts indicating no records were found. While the user wants more records the next 20 are sent to display_parts. If the read is unsuccessful, an error message is sent to display_parts.

display_screen—displays the screen for user input;

user_response—receives user input, formats data and sends to parts_search.

display_data—receives data from parts search and displays the results. This function displays messages to the user When the parts search module receives data from display_parts, it will open the database, read data and look for a match. It will send, e.g., the first ten items found to display_parts and wait for a message from display_parts. If the user asks for the next records, the program will look for the next 20 records and send them to display_parts if found. If records are not found a message is sent to display_parts. If the user is finished, the program will close the database.

The database format for use with the parts search module may be task specific. As with all the other modules, the user input may be voice, keyboard or mouse. Information is read from a parts database that may be in Microsoft Access or Oracle formats. Information is input from the user directly or by selecting "call-out" numbers associated with an image.

In operation, after choosing search, the user will enter data to search for in the database. The user may submit the data, reset the entry fields or cancel the search. The entry screen will appear. A database search will occur and records are read and displayed. The search will look at all fields in the database to make a match. If a match occurs, the first 20 records are displayed with menu options that allows the user to look at the next 20 records, perform a new search, or end the search. If the next option is selected, 20 more records are displayed. The user is able to select a previous option to look at the previous 20 records. If there are no previous or next records, the previous or next option will not be selectable. The search results screen will appear as follows.

Finally, again with reference to FIG. 7, if a database error occurs an error message is displayed. This message is displayed if the program is unable to open or read the database. If the data is not in the expected format, it is unreadable data. If the user has the ability to connect to the customer support center (CSC), there is an option to connect to the CSC to obtain the access to the local database or even access a database on-line. If no database is accessible an error message is displayed prompting the user to contact the CSC.

The remote on-line data are stored in either Microsoft Access or Oracle. The program determines the database format, Microsoft Access or Oracle and communicates it to the user over, e.g., a wireless network. The program will read the header information to determine the fields and field lengths. In case of an error message, the display error message is displayed if the data from the database is not accessible or beyond the user's access level. The user is able to connect to a CSC to obtain access or the information directly.

A graphic part locator is selectable from the parts menu. The content may be customer, machine or operation specific. The graphic file format may be, e.g., .dwf (drawing web files), .bmp (bit map), .pcx (PC Paintbrush), .gif (graphics interchange format) or .jpeg (joint photographic experts group). The source data for a particular machine may be provided by the customer or maybe developed apart or in conjunction with the end user or machine manufacturer. The parts locator module 212 may be written in HTML. The Whip plug-in or other application is used to view files in .dwf format.

The parts locator module serves to display machine parts or operational steps with "call-out" numbers that allow the user to look at the next level of parts break down. For example, once one part containing a number of sub-parts is identified then the user may call out the number or numbers of the sub-parts to observe, e.g., their interaction within the larger unit of parts. This parts breakdown display provides the user with blow-ups and assembly information for the part(s) as well as "call-out" numbers for the parts. The part information from the database may be displayed, e.g., at the bottom of the display for ordering purposes. The part number may be looked up directly and ordered or located. Alternatively, the user may chose to back-up and display the previous part break down at a higher level.

The HTML page displays graphics of the machine and parts. The user is able to view breakdowns of the parts by choosing call-out numbers defined on the graphic and may even view their interaction or assembly video using instructional MPEG video or other images.

The HTML page will call a Visual Basic program, passing it the part information to locate in the parts database. The part data is located in the database and displayed on the screen. The user may input by voice, keyboard or mouse. The user will select Parts from the button menu. The parts sub-buttons will appear as follows.

The voice input may be the user choices, such as, call-out numbers. The call-out numbers are displayed at the next level for a parts break down. Back displays the previous part break down. Help is available from the parts locator module. Alternatively, the user may chose to exit the parts locator module and close the part breakdown information.

The image graphics file can be dwf, bmp, pcx gif or jpeg. The data is stored in either Microsoft Access or Oracle. The program determines the database format, Microsoft Access or Oracle. The program will. read the header information to determine the fields and field lengths. The matching record is displayed.

A message is displayed in the bottom frame if the data from the database is not accessible. The parts locator displays a graphical parts locator of the machine and part information. The parts locator module program may be written in HTML and may contain a top down break down section that has one or more security levels set up in conjunction with or independent of the security module functions.

Reports Module

The primary duty of the reports module is to generate hands-off report logs that reflects the task-specific preventive and repair maintenance of SIMON users. The module also captures a database log of visited screen titles. Report data may be gathered on the initial activation of SIMON and stored in, e.g., Microsoft Access database format. The date and time of the report capture will equal the system's date and time at log-on and indicated accordingly on the report. Failed performances are also captured and recorded. The report module may operate independent of the user in addition to being transparent to the user. Else, the user may activate and inactivate the reporting function depending on their access level.

Users have the option to generate a daily or custom report from the Report button sub-buttons. The daily reporting option prints a daily log of all activities related to preventive and repair maintenance specific to that day. The custom reporting option in the report submenu allows the user to enter the desired time period to print the report. This means that the user is required to specify the beginning and ending periods needed for "printing" under the custom option. The Custom option also allows a filtering option that enables a selection of preventive maintenance only, repair maintenance only, or both. Printing includes both hard copy and electronic data reporting functions.

The accuracy of transmitted data and requirements data are based on report data generated by the system for, e.g., the Microsoft Access database and may be task-specific. Validity of the data is determined from the recording of information within the system report log.

Response time for screen title log capture is less than one second. Response time for printing the Report module will vary depending on the type of printer models used or communications link provided. Response time is also dependent on the frequency of SIMON activity that is captured in report logs, as well as the length of the report or if a number of reports are being submitted at one time.

Figure 8:
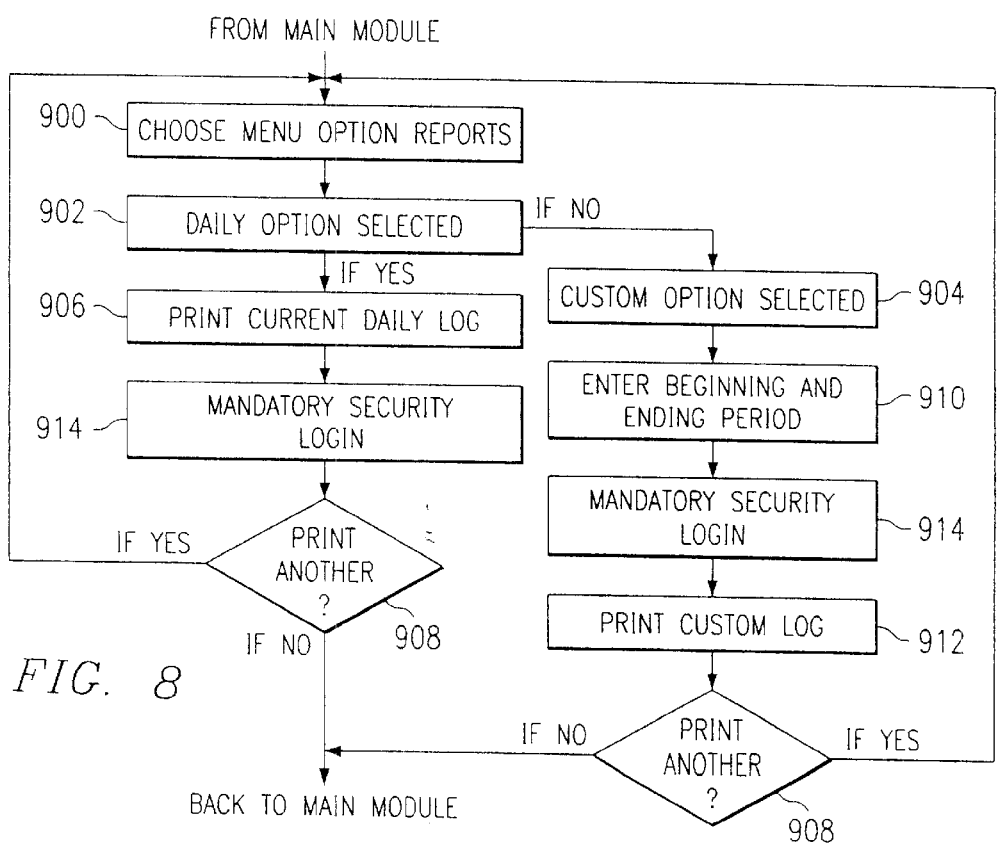
FIG. 8 a flow chart of a basic reports module for use with the invention.

FIG. 8 is a flow chart of the basic reporting functions of the SIMON engine. A Reports button is available from the button menu at the main SIMON engine screen (as are the other modules disclosed herein) and provides access to the reports menu options 900. Selection of the sub-button options under Reports via voice or mouse method initiates the opening of specific or generic electronic reports. There are two selections from which to choose—Daily 902 and Custom 904. Selection of the Daily option 902 prints a report of, e.g., the daily log record. The daily log report may be a prompt for the user to conduct that maintenance or repairs on that day, or may serve to report the users maintenance and repair of the day that passed. Selection of the Custom option prints a report specific to the user's beginning and ending date. The printed report, or an electronic version of the report, may be submitted with the communications module for viewing by the user, to network, to one or more serves, to the customer support center or to any other software package or user that is in need of the report. For example, the finished report may be sent to a remote location for gathering, analyzing, storing and acting upon the reported data.

Selecting to print 906 a particular report invokes the above selection box. A printer must be attached if a hard copy printout is desired. If only a single printer is available, that printer is displayed in the printer text box. If there are multiple printers available, the user will have a box from which to choose the desired printer. The user may wish to print out another report or a copy of the present report at 908. The following are the detailed functional and performance requirements for a reports module.

DAILY—allows the user to print the production day's report log. This function is strictly limited to the current day's log activities. Requirements other than the daily activity should be referred to the submenu function "Custom." Selection of "Daily" option will default with the current date.

CUSTOM—allows the user to directly specify the exact date of desired activity. Users may enter a beginning time period and an ending time period to print the log report. For a printing of the current day's log, the "Daily" option is used.

HTML Page: allows the user to print-out the active HTML page as displayed on the SIMON screen.

The data obtained from the user during a specific fast and maintenance or repair of, the machine, process or operation that is needed may be provided via inputs generated based on log capture activity or via user input. This is directly proportional to the user's frequency of usage. Outputs may be generated with hardcopy reports. In case of failure, the reports menu or failed access to the printing of the report items maybe solved locally or via contact with a customer support center.

If the custom option is selected at 904, then the user enters the beginning and ending period for the custom report 910. Alternatively, the user may be prompted to request different forms or types of reporting, e.g., a more condensed report for transmission via wireless LAN. The report log print-outs are customized according to the customer's desired output 912. Modifications are to be managed by the customer for any subsequent changes to the report format.

Because of the importance of maintaining, filing, keeping and in some cases maintaining security, a mandatory security login 914 requirement may be necessary for access to print log reports whether from daily reports or from the custom reports subroutine of the reports module 214. Without login authority, the reports submenu option is unavailable and disabled.

Security Module

Figure 9:
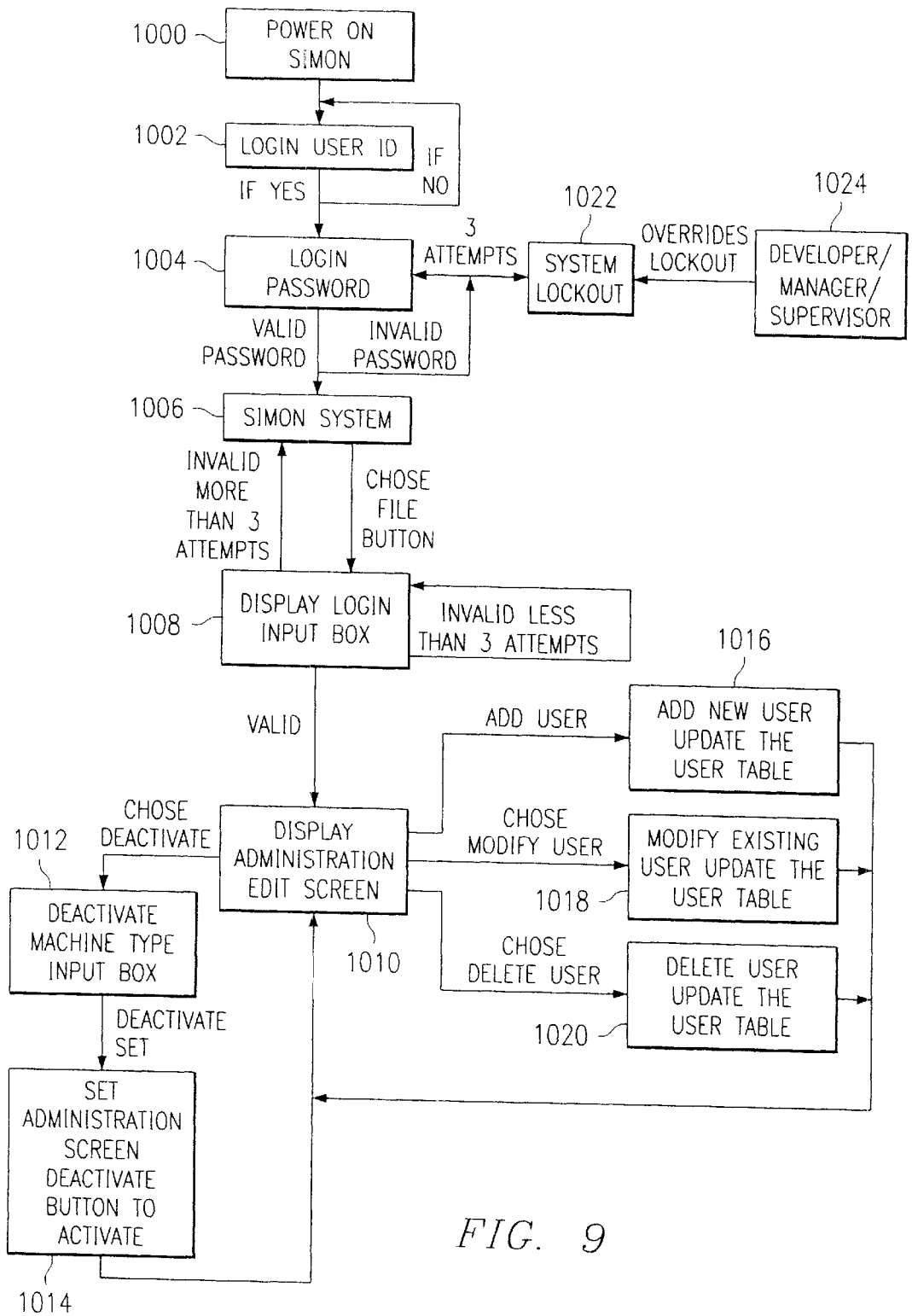
FIG. 9 is a flow chart of the security and administrative module.

The component module of the SIMON engine that maintains security to and from the program is the security module 216. The security module is described in conjunction with FIG. 9, which is a flow chart of the security protocols. The primary duties of the security module are to safeguard software integrity and provide maintenance accountability. The mode of security performance is defined as follows. First, as the SIMON engine is started 1000 the user is prompted to log-in 1002 using their user identification number and if required a password. The process may involve two steps, first the user number is requested and then the user password 1004. If the login and password are correct then the user is allowed to access the SIMON system 1006.

When the security module is a mandatory requirement it allows users to enter a login and personal password to verify and authenticate access. All users must gain access through a valid username and password. An allowance of three attempts, e.g., may be provided.

Part of the SIMON system permits the user to enter the administration option 1006 within, e.g., the file menu or a separate menu. The administration option 1006 requires that the user provide an administration login 1008, having the same or more stringent security requirements than the login user identification 1002 and password 1004 necessary to access the main SIMON engine program.

If a user enters an incorrect login and/or administration password on the initial attempt, the program may allow the user two additional attempts before returning the user to the SIMON engine. If a correct login and password is verified and authenticated, system access into SIMON administration is granted. If the user wishes to make changes 1016, and/or updates 1018 and/or delete 1020 users and passwords for authorized users as well as activate/deactivate the Machine type input box 1012 or delete a user/log-file 1018, the user must provide a valid ID-password. A valid ID-password allows the user access to the Administration Edit screen 1010. Users are able to access options of SIMON's interface menu system. Access into the software's configuration, however, is disallowed. Only developers with a developer's password are allowed to configure system functions. Developers are able to customize configuration features accordingly, for example, an administrator may reach the set administration 1014 screen in which administration access may be completely forbidden, especially from users.

For high level security requirements encryption of passwords and login numbers may be used. Higher security may be achieved using single-key usage coding and encryption. Accuracy of transmitted data and requirements data are based on data for a specific task or provided by a user. Validity of data may be determined by the comparison between given data and the software's embedded data. The following are specific examples of commands and their functionality as it relates to the security module.

<USER>—Login Usage_Login with a password is a mandatory requirement to access SIMON's software system. Access is restricted to non-authorized users. Attempted log-ons are limited to three tries before system lockout occurs. A manager's level access is required to restore system functionality in the event of system lockout. Levels of authorized access are assigned according to user's access needs. There are limitations of user's navigation area within the software (i.e. no access in the configuration environment). Based on predetermined design specification, the user is restricted to modules defined by the developer.

<DEVELOPER>—A developer's password enables the developer to access SIMON's configuration to add/update/change/delete any aspect of the coded modules, thereby allowing the developer to customize SIMON's configurations accordingly.

LOGIN—allow users to enter a personal identifier for individual authorized access. Log-ins require alphanumeric entries with a minimum of, e.g., five and a maximum of ten characters. Alphanumeric entries may or may not be case sensitive.

PASSWORD—allows user to enter a personal code for individual authorized access. Passwords require alphanumeric entries with a minimum of, e.g., five and a maximum of ten characters.

PASSWORD VERIFICATION—allows user to update or change personal code. The system administrator determines the frequency of password changes.

The specific security features for use with a particular user of the SIMON engine may be configured to customer's specifications. Only inputs of login and password data are entered using, e.g., voice or keyboard input. Also, login and password data may be stored for purposes of authorization and authentication. In case of a system or software failure, access to the SIMON system will require a manager's level access or above to restore. Other failures will require coordination with the customer support center for support. Dependent upon the level of desired security, encryption modes between 128 and 256 bit is used to insure stable system integrity.

For high level security tasks, it may be mandatory that system developers and users assign the initial assignment of level logins and passwords. Administrators may change this using high security access codes. Security level access may be partitioned into, e.g., four domains:

1 Administrator domain—highest authorization access; has access rights in all domains; no restrictions are placed on the Administrator security level.

2 Manager domain—has access rights to all areas except the ability to assign security level access for users.

3 Supervisor domain—has access rights to most areas; the Manager and/or Administrator will define the unauthorized areas of access.

4 User domain—has limited authorized access; the Supervisor and/or Manager will define areas of access.

Referring once more to FIG. 9. If a user enters an incorrect login and/or administration password on the initial attempt, the program will allow the user two additional attempts before disabling system access 1022. If a correct login and password is verified and authenticated, system access into SIMON is granted. Valid ID-password will allow the user access to the Administration Edit screen 1024. Users are able to access options of SIMON's interface menu system. Access into the software's configuration, however, is disallowed.

Communication Module

Local

SIMON may be fully voice-activated, that is, functioning primarily on voice commands. A manual keyboard or even visual tracking interface is optional as the input and output device used by the SIMON user to communicate and provide commands to the computer. Likewise, the same input/output capability may be used to access the communications capabilities of the SIMON engine with local users and a local network. Voice operation enables users to navigate SIMON's GUI interface hands-free. Reserved words may be saved for specific SIMON commands, e.g., open, close, print, send and exit. Input/output devices for the construction of a "portable computer", that is a computer sufficiently lightweight and designed to be worn by a user, and may be, e.g., the MENTIS computer (Interactive Solutions, Inc.), weighing about 2 to 5 pounds (exclusive of the battery pack) and is five and a half by seven and a half inches in size. The computer may have a 266 MHz pentium processor with 128 megabytes of RAM and a four, six or eight gigabyte hard drive. The computer may also be connected to a portable CD-ROM, ZIP, DVD or like large scale storage media. Through a wireless connection, the large scale storage medium may even be at a remote location. Other hardware that may be interfaced with the portable computer via SIMON includes but is not limited to:

1) VideoCam: Sony CVX-V1
2) on head set: VGA screen with built-in earpiece
3) hand held: 6.4 by 10.4 inch flat panel display
4) external audio speakers
5) on headphone/microphone set: LabTec Clearvoice™
6) LAN hardware: WaveLAN®, VBX/CODEC Accuracy of transmitted data and requirements data are based on equipment installed per each component of the communications hardware. The accuracy of transmitted data may be checked using systems and software known to those of skill in the art of data verification.

The voice recognition software used by the communication module may be any suitable VR system, preferably the AT&T Watson Voice Control communications software designated for SIMON. The AT&T Watson Voice Control software application may be embedded within SIMON allowing users to speak commands through a microphone via headphones or one attached to SIMON's unit. Alternatively, Dragon Software's NaturallySpeaking® may be used and has the advantage of accepting natural language commands, which allow users to edit and format documents by speaking commands in a more natural way. It also has an enlarged active vocabulary, and Dragon NaturallyMobile™ software, which makes it easy to create documents using a hand-held microphone that can also be used to record any communications.

The Dragon NaturallySpeaking® software application, for example, enables users to navigate SIMON's menu and sub-menu options with reserved spoken words. Non-keyboard interaction may be required which will permit the user to engage in other tasks as well as offering mobility within the work environment. The types and specifics of a user's voice may be stored and accessed from reserved vocabulary commands that are pre-input into the communications module. Voice recognition may even be implemented as a digital signal processor.

Remote

Any communication to a CSC is accessed via SIMON. Likewise, peer to peer communications may be accessed through SIMON to provide communication over a wireless LAN/WAN between SIMON users. One such connection may be through a WaveLAN® card using the NetMeeting software.

The following is a list of functionalities and equipment for use with the present invention.

VideoCam—This unit allows parties other than the user to visually see the same screen information as the user, for example, a Sony CVX-11.

Audio—This unit will allow the user to hear speech and/or sound and interact with the SIMON system via voice activation.

LAN—This connection will allow the SIMON user to connect remotely to a LAN for network interface.

Modem—This unit enables the user to auto dial an IP address to the CSC or other phone lists.

In the event that SIMON's voice recognition functionality is disabled, the unit may be automatically connected with CSC to allow troubleshooting. If further connection fails a manual call in to a CSC may be required to diagnose the problem. If it is a minor hardware failure, a camera connection with a CSC representative may be used to diagnose the problem via video. Video or audio access will afford a solution (i.e., replacement of part) on the failed hardware component. If it is a software failure, remote connection via LAN will allow a CSC representative to upload software directly or allow the user access to that functionality. As a last resort the user may have to re-install the software.

While it may be readily apparent, it is not always easy to interface individual hardware components to be compatible with individual communications components. This is a problem especially when using equipment from different vendors. The present inventors have overcome that problem by using a central program to interface all the hardware components.

Figure 10:
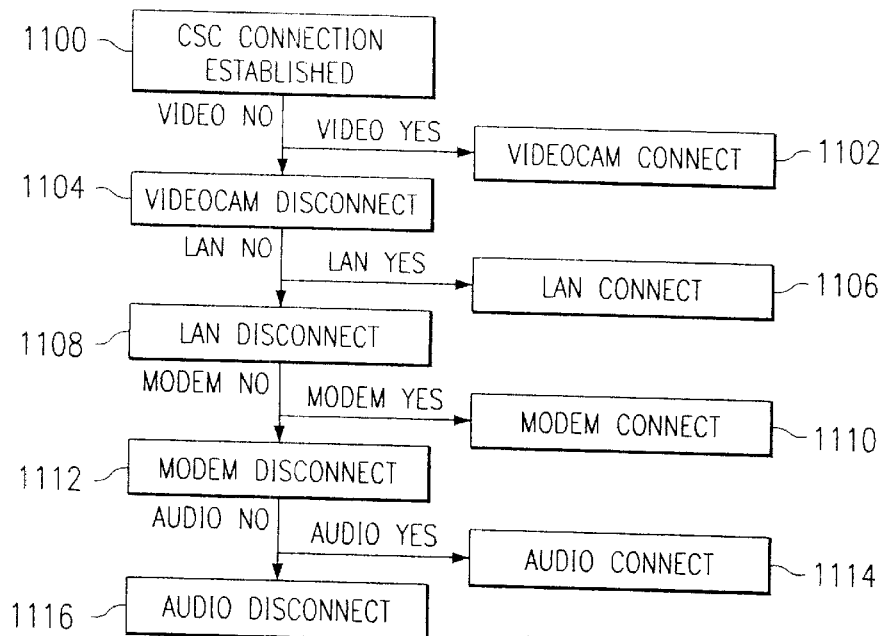
FIG. 10 is a flow chart of the communications module for connecting to peripherals that connect the present invention with outside sources of communication.

In operation, the communication module is described in connection with FIG. 10, in particular with a connection with, e.g., a network, server, or other SIMON users a CSC. Once a connection with a CSC 1100 is established, the user can determine whether or not they want to include video imaging capability over the wireless LAN, WAN or Internet, or wirelessly to one or more antennas which send the signal to a VBX/CODEC system for transmission over ISDN lines. If a visual connection is required, e.g., when the operator at the CSC must also be able to see the operation of the machine and the operators predicament, then the video camera is connected 1102, else the video camera is disconnected 1104. Likewise, the connections to a LAN can be made 1106 or disconnected 1108, a modem connected 1110 or disconnected 1112 and audio may be connected 1114 or disconnected 1116. Communications with a CSC provide the user of SIMON and the SIMON engine to access in real-time a broader and often more experienced workforce that can help the user repair a particular machine.

SIMON is particularly useful when a user at a remote location is presented with a task when dealing with wires or equipment that is color coded. The use of a color video camera with sufficient resolution and transmission rate will be required to provide the CSC with valuable, and perhaps critical information. The use of a color camera will be particularly important to reduce the risk of injury to maintenance and repair personnel that may not be aware of the operational dangers of a particular piece of equipment or process when communicating with a CSC in real time.

Diagnose Module

Figure 11:
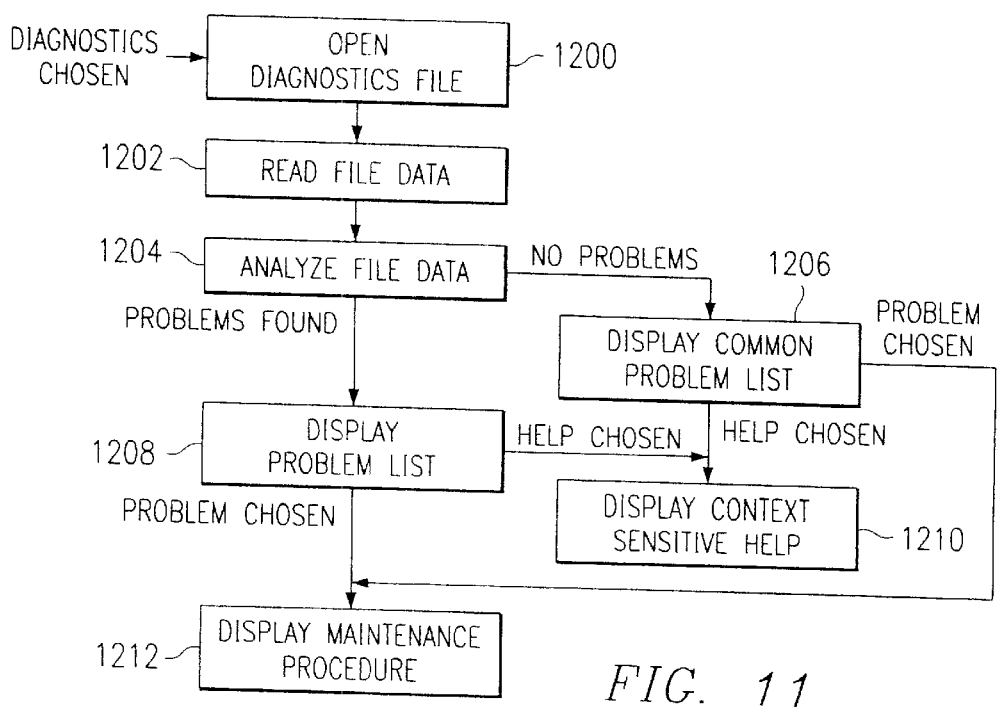
FIG. 11 is a flow chart of the diagnostics module for use with one embodiment of the present invention.

The diagnosis module provides the SIMON engine specific information and routines, protocols or checklists that aid in machine diagnostics. The diagnostic module of the SIMON engine is described herein in connection with FIG. 11. The machine diagnostics process begins with an error code or codes being produced by the machine, operation or process that is in need or repair or maintenance at 1200. This error may be provided for in software in the resident machine and input directly into Simon by the user. Alternatively, the error code entry screen 1202 is chosen from which the user may view and retrieve error codes 1204 from a list or lists or codes. The list may be arranged in a number of configurations, such as alphabetical, numerical, by machine operation or part grouping, etc. To evaluate and determine what problems may be occurring on the machine the user then accesses a database to get to the matching, appropriate or related HTML links 1206 that are specific or related to the error codes. Next, a dynamic HTML menu page is written to disk 1208 and the user reaches a browser window 1210 that provides the user with options 1212, which permit the user to access, for example, hyperlink controls 1214 may also have standard and customized browser controls for further navigation 1218.

If hyperlink 1214 is chosen, then a context sensitive display 1216 is activated that provides the user with specific information about the content of help available. For example, MPEG video, AutoCAD drawings, viewer and schematics, etc. are displayed for the user. Alternatively, the user may select to enter a browser control 1218 window though which the user select may elect to operate the functions of the browser, such as home, refresh, back, print, find, etc. that are enabled through the HTML menu page 1220.

Based on an analysis of the operational situation of a particular user and machine, process or operation is determined. The diagnosis module will have access to machine, process or operation specific information that is part of the task specific database that the SIMON engine is able to access.

The diagnostics module may merely function as a troubleshooting guide, but in particular cases and instances may be designed to be a fully integrated, multi-functional, multimedia system that guides the user through the diagnostic procedures of a particular piece of equipment, operation or process.

For example, a menu of common problems encountered with a particular operation may be displayed as a selectable menu. If no common problems are found, a common problem list (which may be searchable) is displayed and the user is prompted to select an option. Alternatively, the user may access a help menu 1210 either from the common problems list or from a more generic problems list. If a particular problem is selected by the user, then the maintenance procedure for that equipment, machine, operation or precess is displayed. Different levels of explanation may be presented, depending on the complexity of the task or the user's need for instructional help.

The user will be provided with a task specific diagnostics file and file format, e.g., the common problem list. The diagnostics module may be written in Microsoft C++ version 6.0. The diagnostics module will generally be task specific. For example, the customer may also provide the machine diagnostics file and information on interpreting the file. The customer provides a common problem list, which might include non-diagnosable problems.

The diagnostic module will read the reported error data provided by the system or the user and determine what problems are being reported or observed on the machine, process or operation. A problem menu is displayed with the results. If no problems are reported, a common problem list is displayed from which the user may select maintenance or repair information.

One example of a diagnostics program is called KBS (Knowledge Based System). When the diagnostics program is called, the machine diagnostics file is read and analyzed. The KBS will read a table to match the analyzed data to a problem description and HTML (HyperText Markup Language) file name. As with all the other modules disclosed herein, the diagnostics module may be implemented in software or hardware.

The following are a number of specific commands that may be used with the diagnostic module.

Diagnose—opens and reads the machine diagnostics file. The data is analyzed, depending on the customers or task file specifications. Problem numbers are sent to get_problems. If no problem numbers are found, a common problem list is displayed.

Get_problems—opens a kbs.tbl file and matches the problem numbers received to a problem description and a html file name. This information is sent to the calling html page so that it can display the problems and associate an html page to each problem number.

Learning Module

The learning module may be customer, machine, operation, equipment, or process specific. The learning module may be developed using, e.g., Macromedia Authorware. While the customer may provide the source data for the learning module, custom learning systems may be developed to service particular system needs.

An interactive learning application may be developed, in Macromedia Authorware for customers choosing this module. The learning module may be an interactive training application and can include animation, sound, hot spots, 3D graphics, simulations, quizzes, quiz grading, video clips, show me, interactive assembly/disassembly of components and tracking student progress.

The learning module is an interactive learning tool that serves to teach, in real-time a SIMON user the detailed operation of a machine or process and the manner or carrying out repair or maintenance operations without the need to resort to hard copies or user's manuals. Training screens are displayed and allow users to interact with the application to learn about the customers system.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A computer communication system, comprising:
    a computer of a size sufficiently small to be worn by a user; a memory connected to and under control of the computer;
    a display device that can receive display signals from the computer for visual display to the user;
    an input device by which the user enters commands to the computer;
    a wireless data transmitting and receiving station having a range, which station can transmit data to and receive data from the computer anywhere within the range;
    a wireless data transmitting and receiving device connected to the computer, which device can transmit data to the station and receive data from the station, the wireless transmitting and receiving device transmitting video images relating to a task performed by the user to an assistant and receiving instructions from the assistant as the assistant views the images; and
    a computer network that can send data to and receive data from the wireless station while the user is working on the task within range of the wireless station.

2. The system of claim 1, wherein the computer has a weight less than two pounds.

3. The system of claim 1, further comprising a garment suitable for securing the computer on the user's body and means for mounting the computer on the garment.

4. The system of claim 3, wherein the mounting means comprises a belt.

5. The system of claim 3, wherein the garment includes a strap and means for fastening and unfastening the strap.

6. The system of claim 1, further comprising an instructional program including a program engine that contains a program logic, which program logic being loading into memory, whereby the program engine includes one or more user assistance programs that may be accessed by the user through the program engine and the program engine can access a database containing data that is specific to the task.

7. The system of claim 6, wherein the instructional program comprises one or more search modules each accessible by the program engine for searching a database containing data that is specific to the task.

8. The system of claim 7, wherein the instructional program includes program logic permitting the user to select an image of one or more parts of the apparatus to view on the display deice.

9. The system of claim 8, wherein the instructional program includes name data identifying one or more parts of the apparatus that the user has selected to view.

10. The system of claim 8, wherein the data includes instructions for assembly or disassembly of the one or more parts of the apparatus that the user has selected to view.

11. The system of claim 8, wherein the data includes instructions for repair of the parts of the apparatus that the user has selected to view.

12. The system of claim 8, wherein the data includes instructions for fault diagnosis of the parts of the apparatus that the user has selected to view.

13. The system of claim 8, wherein the display device includes means for temporarily mounting the display device in proximity to the parts the user has selected to view.

14. The system of claim 6, wherein the task comprises a manual operation undertaken during a manual repair.

15. The system of claim 6, wherein the task comprises a manual operation undertaken on an apparatus, and the data comprises images of the apparatus.

16. The system of claim 1, wherein the task comprises a manual operation undertaken on an apparatus.

17. The system of claim 16, wherein the manual operation comprises repair of the apparatus.

18. The system of claim 16, wherein the manual operation comprises maintenance of the apparatus.

19. The system of claim 1, wherein the task comprises a manual operation undertaken on an apparatus to control a process.

20. The system of claim 1, wherein the task is performed at a location where the apparatus is installed for use.

21. The system of claim 1, wherein the task is performed at a location on the apparatus at which a standard desktop computer cannot be accessed by the user at the same time as the task is performed.

22. The system of claim 1, further comprising a data retrieval device connected to and under the control of the computer, which data retrieval device accesses a data storage medium on which all or part of the instructional program is stored.

23. The system of claim 22, wherein the data storage medium on which all or part of the instructional program is stored is a hard disk.

24. The system of claim 22, wherein the data storage medium on which all or part of the instructional program is stored is a CD-ROM.

25. The system of claim 22, wherein the data storage medium on which all or part of the instructional program is stored is a DVD.

26. The system of claim 22, wherein the data storage medium on which all or part of the instructional program is stored is a ROM.

27. The system of claim 22, further comprising a data entry system connected to the computer by which the user can enter data into the computer which is then stored on the storage medium.

28. The system of claim 22, wherein the instructional program that the computer accesses and stores in memory is stored on the storage medium.

29. The system of claim 22, wherein the instructional program that the computer accesses and stores in memory is stored as ROM.

30. The system of claim 22, wherein the instructional program that the computer accesses and stores in memory is uploaded to the computer via a wireless communication.

31. The system of claim 1, further comprising:
a data entry system connected to the computer by which the user can enter data into the computer; and
a data storage and retrieval device connected to and under the control of the computer on which data generated by the user is stored.

32. The system of claim 1, wherein the wireless data transmitting and receiving device transmits and receives radio frequency signals.

33. The system of claim 1, wherein the wireless data transmitting and receiving device transmits and receives an audio signal that is an analog signal via a modem.

34. The system of claim 1, wherein the wireless data transmitting and receiving device transmits and receives an analog audio signal via a cellular link.

35. The system of claim 1, wherein the wireless data transmitting and receiving device transmits and receives an analog video signal.

36. The system of claim 1, wherein the wireless data transmitting and receiving device transmits and receives a video signal via a cellular link.

37. The system of claim 1, wherein the wireless data transmitting and receiving device transmits and receives a digital audio signal.

38. The system of claim 1, wherein the wireless data transmitting and receiving device transmits and receives a digital signal via a digital telephone link.

39. The system of claim 1, wherein the wireless data transmitting and receiving device transmits and receives a digital signal via a digital modem.

40. The system of claim 1, wherein the wireless data transmitting and receiving device transmits and receives a digital video signal.

41. The system of claim 1, wherein the wireless data transmitting and receiving device transmits and receives a video signal via a digital telephone link.

42. The system of claim 1, wherein the wireless data transmitting and receiving device transmits and receives a video signal via a digital modem.

43. The system of claim 1, wherein the wireless data transmitting and receiving device transmits and receives communication between users on the same network within the same location.

44. The system of claim 1, wherein the wireless data transmitting and receiving device transmits and receives communications between a user and a customer support center at a remote location.

45. The system of claim 1, wherein the wireless data transmitting and receiving device transmits and receives data through a VBX/CODEC box.

46. The system of claim 1, wherein the wireless data transmitting and receiving device transmits and receives data through a hardwired network that connects via TCP/IP through a secure internet link to the remote location.

47. The system of claim 1, wherein the wireless data transmitting and receiving device is a cellular phone.

48. A computer communication system, comprising:
a first computer of a size sufficiently small to be worn by a user; a memory connected to and under control of the first computer;
a display device that can receive display signals from the first computer for visual display to the user;
an input device by which the user enters commands to the first computer;
a wireless data transmitting station, which station capable of receiving and transmitting data from the station;
a wireless data transmitting and receiving device connected to the first computer, which device can transmit data, the wireless transmitting and receiving device transmitting video images relating to a task performed by the user to an assistant and receiving instructions from the assistant as the assistant views the images; and
a second computer of a size sufficiently small to be worn by a user;
a memory connected to and under control of the second computer;
a display device that can receive display signals from the second computer for visual display to the user;
an input device by which the user enters commands to the second computer; and
a wireless data transmitting and receiving device connected to the second computer, which device can transmit data to, and receive data from, the wireless transmitting station, whereby the data is generated by the user wearing the first computer.

* * * * *

(12) EX PARTE REEXAMINATION CERTIFICATE (6050th)
United States Patent
Mitchell et al.

(10) Number: US 6,574,672 C1
(45) Certificate Issued: Dec. 11, 2007

(54) SYSTEM, APPARATUS AND METHOD FOR PROVIDING A PORTABLE CUSTOMIZABLE MAINTENANCE SUPPORT COMPUTER COMMUNICATIONS SYSTEM

(75) Inventors: Dennis B. Mitchell, The Colony, TX (US); Dennis G. Lewis, North Richland Hills, TX (US); James V. W. Head, Hurst, TX (US)

(73) Assignee: Siemens Dematic Corp., Grand Rapids, MI (US)

Reexamination Request:
No. 90/007,097, Jun. 23, 2004

Reexamination Certificate for:
Patent No.: 6,574,672
Issued: Jun. 3, 2003
Appl. No.: 09/408,288
Filed: Sep. 29, 1999

Related U.S. Application Data
(60) Provisional application No. 60/126,759, filed on Mar. 29, 1999.

(51) Int. Cl.
*G06F 15/16* (2006.01)

(52) U.S. Cl. .................. 709/250; 709/200; 709/201; 709/204; 709/217; 709/218

(58) Field of Classification Search .................. None
See application file for complete search history.

(56) References Cited

U.S. PATENT DOCUMENTS

| | | | |
|---|---|---|---|
| 5,305,244 A | | 4/1994 | Newman et al. ............ 708/141 |
| 5,509,009 A | * | 4/1996 | Laycock et al. ............ 370/259 |
| 5,572,528 A | * | 11/1996 | Shuen ........................ 370/402 |
| 5,619,183 A | * | 4/1997 | Ziegra et al. ............... 340/505 |
| 5,699,513 A | * | 12/1997 | Feigen et al. ............... 713/201 |
| 5,844,824 A | | 12/1998 | Newman et al. ............ 708/141 |
| 5,933,479 A | | 8/1999 | Michael et al. ......... 379/110.01 |
| 6,317,039 B1 | * | 11/2001 | Thomason .................. 340/505 |

OTHER PUBLICATIONS

Business Wire, Hitachi Unveils New Handheld PC Line, Including World's first Color Unit With Oversize Screen and Desktop–Like Keyboard Powered by a SuperH 100MHz RISC Chip, 2 pages, Mar. 11, 1998.*

"Evaluation of a Wearable Computer Performance Support System" by Ockerman et al., presented at the 1st International Symposium on Wearable Computer on Oct. 13–14, 1997 available at http://www.computer.org/proceedings/8192/pdf/81920010.pdf.

* cited by examiner

*Primary Examiner*—Majid A. Banankhah

(57) ABSTRACT

An apparatus and method is disclosed for providing a user with task-specific information that includes a portable instruction system that may be worn by a user, and includes, a computer sufficiently lightweight and designed to be worn by a user to which a memory has been connected. The system includes a display device that can receive display signals from the computer for visual display to the user and an input device by which the user enters commands to the computer. An instructional program is provided that the computer accesses and stores in memory in response to a user command and displays information concerning a task to be performed by the user on the display device in response to commands from the user.

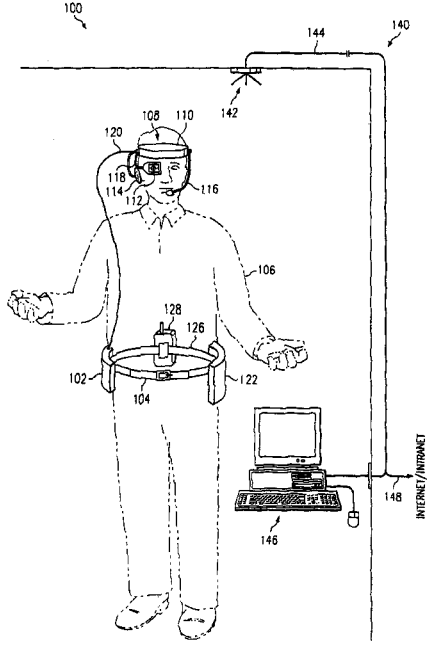

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–48 are cancelled.

* * * * *